(12) United States Patent
Kawaguchi et al.

(10) Patent No.: US 11,158,861 B2
(45) Date of Patent: Oct. 26, 2021

(54) POSITIVE ELECTRODE GRID BODY FOR LEAD-ACID BATTERY, AND LEAD-ACID BATTERY

(71) Applicant: The Furukawa Battery Co., Ltd., Yokohama (JP)

(72) Inventors: Yutaro Kawaguchi, Iwaki (JP); Yusuke Ogino, Iwaki (JP); Atsushi Sato, Iwaki (JP); Shinya Suge, Iwaki (JP); Katsuya Nukui, Iwaki (JP); Akihiro Nishimura, Iwaki (JP); Koshin Takemoto, Iwaki (JP); Ryo Tainaka, Iwaki (JP); Masashi Matsushita, Iwaki (JP); Hideki Hagihara, Iwaki (JP); Masaki Shimotsuya, Iwaki (JP); Jun Furukawa, Iwaki (JP)

(73) Assignee: The Furukawa Battery Co., Ltd., Iwaki (JP)

(*) Notice: Subject to any disclaimer, the term of this patent is extended or adjusted under 35 U.S.C. 154(b) by 0 days.

(21) Appl. No.: 16/831,228

(22) Filed: Mar. 26, 2020

(65) Prior Publication Data

US 2020/0227758 A1 Jul. 16, 2020

Related U.S. Application Data

(63) Continuation of application No. PCT/JP2018/018216, filed on May 10, 2018.

(30) Foreign Application Priority Data

Feb. 28, 2018 (JP) .............................. JP2018-035607

(51) Int. Cl.
*H01M 4/14* (2006.01)
*H01M 4/68* (2006.01)
*H01M 4/73* (2006.01)
*H01M 10/06* (2006.01)
*H01M 4/02* (2006.01)

(52) U.S. Cl.
CPC ............... *H01M 4/73* (2013.01); *H01M 4/14* (2013.01); *H01M 4/685* (2013.01); *H01M 10/06* (2013.01); *H01M 2004/028* (2013.01); *H01M 2220/20* (2013.01)

(58) Field of Classification Search
CPC .......... H01M 4/73; H01M 4/14; H01M 4/685; H01M 10/06; H01M 2004/028; H01M 2220/20; H01M 4/68; Y02E 60/10; C22C 11/06

See application file for complete search history.

(56) References Cited

U.S. PATENT DOCUMENTS

| | | | |
|---|---|---|---|
| 4,221,852 A * | 9/1980 | Qureshi ................. | H01M 4/73 429/211 |
| 4,320,183 A * | 3/1982 | Qureshi ................. | H01M 4/73 429/211 |
| 5,989,749 A | 11/1999 | Kao et al. | |
| 2002/0090554 A1* | 7/2002 | Chen ..................... | H01M 4/685 429/241 |
| 2005/0142443 A1* | 6/2005 | Mercado ................ | C22C 11/06 429/226 |
| 2007/0160910 A1* | 7/2007 | Sugie .................... | H01M 4/667 429/245 |
| 2007/0193009 A1* | 8/2007 | Vincze .................. | H01M 4/742 29/2 |

FOREIGN PATENT DOCUMENTS

| | | |
|---|---|---|
| CN | 1279824 | 1/2001 |
| CN | 102738470 | 10/2012 |
| CN | 202817102 | 3/2013 |
| CN | 203312411 | 11/2013 |
| CN | 107086307 | 8/2017 |
| JP | S51-21134 | 6/1976 |
| JP | S54-32734 | 3/1979 |
| JP | S54-49548 | 4/1979 |
| JP | S60-84770 | 5/1985 |
| JP | H02-281563 | 11/1990 |
| JP | H05-045901 | 6/1993 |
| JP | 2001236964 | 8/2001 |
| JP | 2001351671 | 12/2001 |
| JP | 2001524736 | 12/2001 |

(Continued)

OTHER PUBLICATIONS

Yamada, Keizo, et al. "Computer-aided optimization of grid design for high-power lead-acid batteries." Journal of power sources 144.2 (2005): 352-357. (Year: 2005).*
International Search Report for International Application PCT/JP2018/018216, dated Jun. 26, 2018.
Albert et al., Improved lead alloys for lead/acid positive grids in electric-vehicle applications, Journal of Power Sources, 1997, pp. 257-265, vol. 67.
Office Action issued in corresponding CN Application No. 201880064041.3, dated Aug. 3, 2020.
Supplementary European Search Report for EP Application 18907954.4, dated Apr. 9, 2021.

*Primary Examiner* — Muhammad S Siddiquee
(74) *Attorney, Agent, or Firm* — Burris Law, PLLC

(57) ABSTRACT

A positive electrode grid body for lead-acid battery includes frame rib including first and second lateral frame ribs and first and second longitudinal frame ribs, an inner rib including a plurality of lateral and longitudinal crosspieces, a plurality of opening portions, and a positive electrode current collection lug connected to the first lateral frame rib. In a region having a length of at least one opening portion or more in the lateral direction of the lateral crosspieces from the first longitudinal frame rib, a cross-sectional area of the plurality of lateral crosspieces located on at least the first lateral frame rib side becomes larger from the second longitudinal frame rib side toward a portion connected to the first longitudinal frame rib.

14 Claims, 5 Drawing Sheets

(56) References Cited

FOREIGN PATENT DOCUMENTS

| | | |
|---|---|---|
| JP | 2004521445 | 7/2004 |
| JP | 2007179898 | 7/2007 |
| JP | 2012079609 | 4/2012 |
| JP | 5103385 | 12/2012 |
| JP | 2013016499 | 1/2013 |
| WO | 2002007286 | 1/2002 |
| WO | 2007095725 | 8/2007 |

* cited by examiner

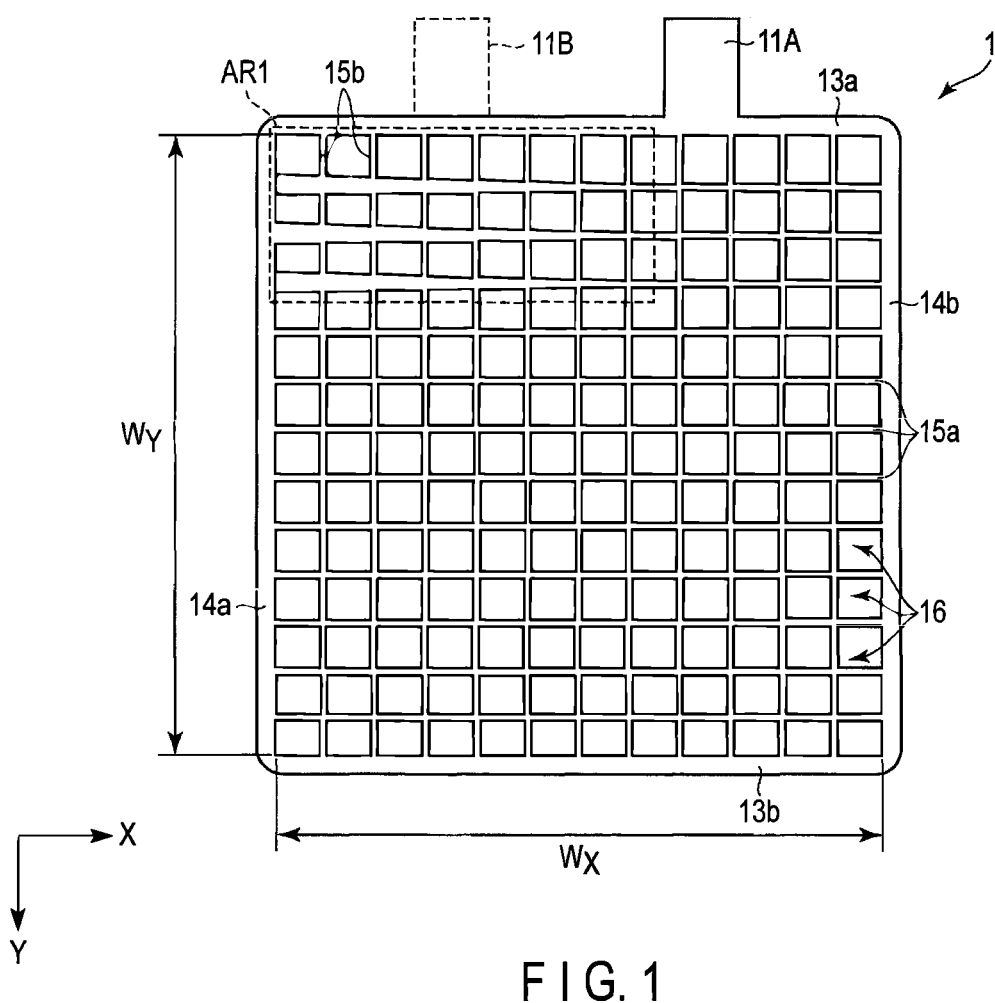
F I G. 1

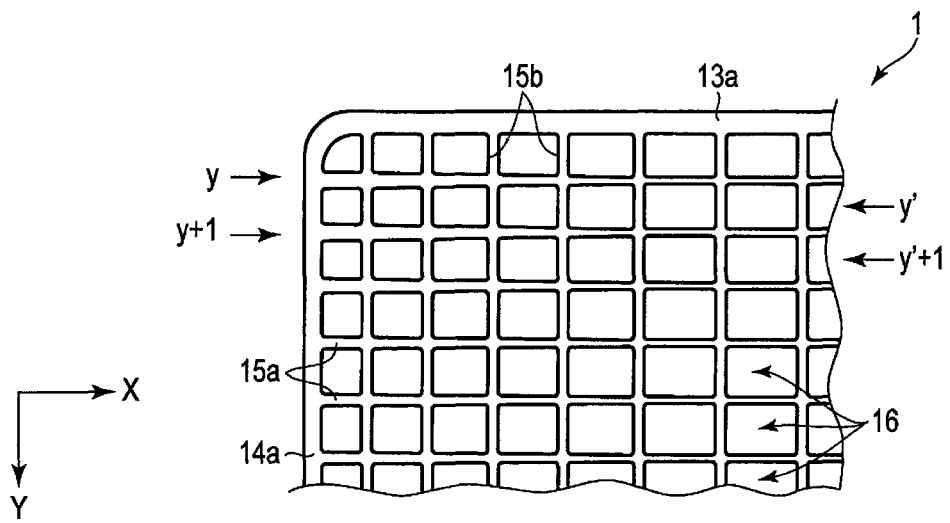
F I G. 3
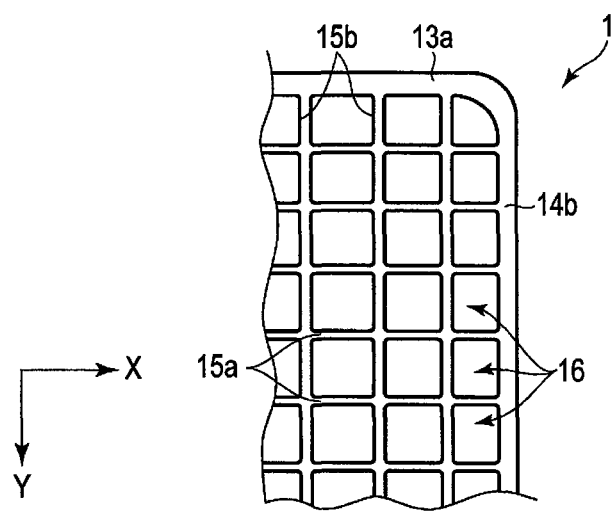
F I G. 4

POSITIVE ELECTRODE GRID BODY FOR LEAD-ACID BATTERY, AND LEAD-ACID BATTERY

CROSS-REFERENCE TO RELATED APPLICATIONS

This application is a continuation of International Application No. PCT/JP2018/018216, filed on May 10, 2018, which claims priority to and the benefit of Japanese Patent Application No. 2018-035607 filed on Feb. 28, 2018. The disclosures of the above applications are incorporated herein by reference.

FIELD

The present disclosure relates generally to a positive electrode grid body for lead-acid battery, and a lead-acid battery.

BACKGROUND

In order to cope with the seriousness of environmental problems and emission control in recent years, automobiles equipped with an idle start-stop function to temporarily stop the engine at the time of stopping (hereinafter referred to as "ISS vehicle") have been prevalent. The ISS vehicle can suppress fuel consumption caused by idling when it stops while waiting for a traffic light. For this reason, fuel efficiency can be improved and the amount of exhaust gas can also be reduced.

It is known that a lead-acid battery mounted on an ISS vehicle described above is likely to have a short life. The reason that in the ISS vehicle, power is supplied to devices such as an air conditioner, lights, wipers and a car navigation system when the engine is stopped for waiting for a traffic light, etc. As a result, a large load is applied to a lead-acid battery for reasons that the lead-acid battery is used to a deep discharge depth, that discharging for restarting the engine at the time of start and charging by using the alternator and the regenerative braking are repeated, and the like.

A lead-acid battery is produced through a process in which the electrode plate group having a laminated structure is accommodated into the battery case, and then dilute sulfuric acid which is an electrolytic solution is injected into the battery case. In an electrode plate group having a laminated structure, positive plates and negative plates in which a paste-like active material is filled into a grid body mainly formed of lead or a lead alloy, and separators are laminated alternately. As the grid body, for example, a grid body having a structure including a frame rib and an inner rib surrounded by the frame rib is conventionally known. A frame rib includes a first lateral frame rib which is arranged on an upper side and on which a current collection lug is formed, a second lateral frame rib arranged on a lower side, and first and second longitudinal frame ribs which connect end portions of the first and second lateral frame ribs. The inner rib includes a plurality of longitudinal crosspieces and lateral crosspieces. In the grid body, an active material is filled into at least an opening portion defined as a region surrounded by the frame rib and the inner rib.

One of the life factors of such a lead-acid battery is expansion and deformation of the whole positive electrode grid body accompanying corrosion and expansion of the positive electrode grid body. The deformation of the positive electrode grid body is called growth. When growth occurs, a part of the positive electrode grid body may be bent and broken, and the broken end may break through the separator and contact an opposite negative plate, or the positive electrode grid body may expand upward and contact a part of a negative electrode such as a negative electrode strap to bring about an internal short circuit, and a life of a lead-acid battery may be shortened. In addition, deformation of the positive electrode grid body causes peeling or dropping of the positive electrode active material, which causes an early capacity reduction. Due to the above-mentioned circumstances, when a lead-acid battery is designed, it is necessary to take measures for the growth of the positive electrode grid body.

The mechanism by which growth occurs is considered as follows. Corrosion in the lead-acid battery results from an oxidation reaction that lead or a lead alloy forming the positive electrode grid body reacts with sulfate ions mainly contained in an electrolyte solution and an active material by charging and discharging to change to a corrosion reaction product of a multilayer structure composed of $PbO_x$ (x: 1 to 2), $PbSO_4$, or the like. The corrosion proceeds with repetition of charging and discharging. At this time, a layer of a corrosion reaction product grows in the vicinity of the surface of the positive electrode grid body which is in contact with the electrolytic solution. Since the growth of the corrosion reaction product is accompanied by increase in the volume of the positive electrode grid body, when the corrosion progresses, a large stress is generated by the difference in degree of the expansion of the corrosion reaction product which is in the vicinity of the surface of the positive electrode grid body and the internal positive electrode grid body itself. As a result, the stress becomes a tensile stress which expands the positive electrode grid body, and causes the growth accompanied by the expansion of the entire positive electrode grid body.

The electrode plate group of the lead-acid battery is fixed to a lid or an upper part of the battery case by the pole post provided to extend upward from the strap or the connecting member between the cells. For this reason, when the growth is occurs, the positive plate first extends toward the left and right sides and the lower side where not fixed. In the initial growth, the elongation to the lower side is often smaller than the elongation to the left and right sides of the positive plate. This is because the lower end of the electrode plate group is in contact with the bottom surface of the battery case or a saddle portion provided on the bottom surface to support the electrode plate group. Therefore, when the growth occurs, since the downward extension turns to the upward extension in the positive plate, the upper end of the positive plate may come into contact with a part of the negative electrode such as a negative electrode strap to cause an internal short circuit.

As a means for preventing the internal short circuit due to the growth to the upper side of the positive electrode grid body, the applicant has proposed a lead-acid battery in which a saddle portion of a battery case holding an electrode plate group is formed of sponge or foaming resin, in JP 2001-351671 A and JP H05-045901 U. By forming the saddle portion of the battery case of sponge or foaming resin, the saddle portion collapses to absorb the downward extension when growth occurs at the positive electrode grid body. For this reason, upward elongation of the positive electrode grid body can be suppressed, and contact with the negative electrode strap or the like, and internal short circuit can be prevented.

On the other hand, various inventions for suppressing the internal short circuit between the positive electrode grid body and the negative grid body in a mode different from the configurations of two patent documents mentioned above have been proposed. JP 2012-079609 A discloses a lead-acid battery having a structure in which a positive plate is suspended such that a lower side of the positive plate is not in contact with a bottom portion of a battery case. In this lead-acid battery, when the growth occurs, the positive plate preferentially extends downward, and therefore the upward extension and an internal short circuit due to a contact between the positive plate and the negative plate caused by the upward extension is suppressed.

JP 5103385 B and JP 2013-16499 A disclose lead-acid batteries provided with a positive electrode grid body having low mechanical strength portion such as a notch, a constriction portion or the like at a predetermined portion, as a method for suppressing the contact between the positive plate and the negative plate by the growth. By forming a portion having a low mechanical strength at a part of the positive electrode grid body, when the growth occurs, the low mechanical strength portion is preferentially broken or deformed, and the expansion of the entire positive electrode grid body is suppressed.

In addition to the technique for suppressing the growth of the positive electrode grid body caused by corrosion, it is also considered to improve the life of the lead-acid battery by preventing of the deformation caused by expansion and contraction of the active material during charging and discharging cycles.

JP H02-281563 A discloses a lead-acid battery in which, in a positive electrode grid body, an arrangement interval of longitudinal crosspieces and lateral crosspieces constituting an inner rib becomes smaller from a central portion toward a peripheral portion. By thus reducing the arrangement interval of the longitudinal crosspieces and the lateral crosspieces from the central portion to the peripheral portion, the longitudinal crosspieces and the lateral crosspieces are arranged more densely at the peripheral portion of the positive electrode grid body. For this reason, mechanical strength of the positive electrode grid body is improved. For this reason, when the positive electrode active material expands by charging in the surface direction, the deformation of the positive electrode grid body particularly in the lateral direction is suppressed, and the cycle characteristics of the lead-acid battery are improved.

SUMMARY

However, lead-acid batteries disclosed in JP 2001-351671 A, JP H05-045901 U, and JP 2012-079609 A are assumed to be lead-acid batteries for a stationary power source used in a stationary state. For this reason, there was a point which should be improved in durability as an application where severe vibration is assumed, for example, a starting power sources for vehicles. In the lead-acid batteries disclosed in three patent publications mentioned above, a heavy-weight electrode plate group is supported and held by almost only the current collection lug connected to an upper strap. For this reason, there is a possibility that the electrode plate group may be broken at the part of the current collection lug when intense vibration is applied thereto.

In contrast, in the lead-acid batteries disclosed in JP 5103385 B and JP 2013-16499 A, since the notch or constriction is provided at a part of the positive electrode grid body, the electric resistance becomes locally large in this portion, the potential distribution during charging and discharging becomes non-uniform to degrade the current collection efficiency, which may cause degradation in output characteristics. In addition, if the notch or constriction is provided, the shape of the mold used for manufacturing the positive electrode grid body may be complicated, which may cause an increase in manufacturing costs and a deterioration in yield. In particular, in the manufacture of a positive electrode grid body by casting, molten lead or lead alloy may generate misrun in a mold, which may result in casting defects such as broken lines.

As the positive electrode grid body disclosed in JP H02-281563 A, if the arrangement interval of the longitudinal crosspieces and the lateral crosspieces constituting the inner rib becomes smaller from the central portion toward the peripheral portion, the area of the opening portion located in the peripheral portion of the positive electrode grid body is smaller than that in the central portion of the positive electrode grid body. For this reason, the area of the opening portion located at the center portion of the positive electrode grid body becomes large. In general, the current density during charging and discharging in the positive electrode grid body is larger as it is located on the upper side near the positive electrode collection lug, and smaller as it is located on the lower side. In addition, expansion and contraction of the positive electrode active material occur accompanying the charging and discharging reactions, and the charging and discharging reactions is proportional to the current density. For this reason, expansion and contraction of the positive electrode active material become larger on the upper side of the positive electrode grid body, and smaller on the lower side thereof. As a result, as disclosed in JP H02-281563 A, if the distribution of the areas of the opening portions is made point-symmetrical with respect to the center portion of the positive electrode grid body, when the distribution of current density is taken into consideration, it is not necessarily the most efficient way to prevent the expansion and contraction of the positive electrode active material, and there is room for improvement. In addition, as also disclosed in JP H02-281563 A, increase in the number of longitudinal crosspieces and lateral crosspieces leads to increase in the weight of the lead-acid battery itself. For this reason, if the arrangement intervals of the longitudinal crosspieces and the lateral crosspieces are made dense on the lower side of the positive electrode grid body, which contributes little to the prevention of expansion and contraction of the positive electrode active material, the reduction in weight of the lead-acid battery is impaired.

An object of the present invention is to provide a positive electrode grid body for lead-acid battery and a lead-acid battery, which can prevent an internal short circuit caused by deformation of the positive electrode grid body and which can improve the life of the lead-acid battery.

To solve the above problem, one of the embodiments described herein aims to provide a positive electrode grid body for lead-acid battery, comprising: a frame rib shaped in a rectangular frame comprising a first lateral frame rib located on the upper end and extending in a lateral direction, a second lateral frame rib located on a lower end and extending in the lateral direction, a first longitudinal frame rib located on a left end and extending in a longitudinal direction, and a second longitudinal frame rib located on a right end and extending in the longitudinal direction, when the positive electrode grid body is viewed in planar view; an inner rib disposed in the frame rib and comprising a plurality of lateral crosspieces and longitudinal crosspieces which are connected to the frame rib to form a grid; a plurality of opening portions defined by a region surrounded by the frame rib and the plurality of lateral crosspieces and longitudinal crosspieces, and a region surrounded by the plurality of lateral crosspieces and longitudinal crosspieces; and a positive electrode current collection lug connected to the first lateral frame rib and located on the second longitudinal frame rib side, wherein in a region having a length of at least one opening portion or more in the lateral direction of the lateral crosspieces from the first longitudinal frame rib, a cross-sectional area of the plurality of lateral crosspieces located on at least the first lateral frame rib side becomes larger from the second longitudinal frame rib side toward a portion connected to the first longitudinal frame rib, an average area of the plurality of opening portions adjacent to the first longitudinal frame rib and the plurality of opening portions adjacent to the second longitudinal frame rib in planar view is smaller than an average area of a remaining plurality of opening portions excluding the plurality of opening portions, and an area of the plurality of the opening portions in planar view adjacent to the first longitudinal frame rib becomes smaller stepwise from the second lateral frame rib side toward the first lateral frame rib side, and an area of the plurality of the opening portions in planar view adjacent to the second longitudinal frame rib becomes smaller stepwise from the second lateral frame rib side toward the first lateral frame rib side.

To solve the above problem, another embodiment aims to provide a lead-acid battery comprising the positive electrode grid body for lead-acid battery.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a plan view showing a positive electrode grid body according to a first embodiment.

FIG. 3 is a partially enlarged plan view showing the positive electrode grid body shown in FIG. 2.

FIG. 4 is a partially enlarged plan view showing the positive electrode grid body shown in FIG. 2.

DETAILED DESCRIPTION

The <First Embodiment>

Figure 2:
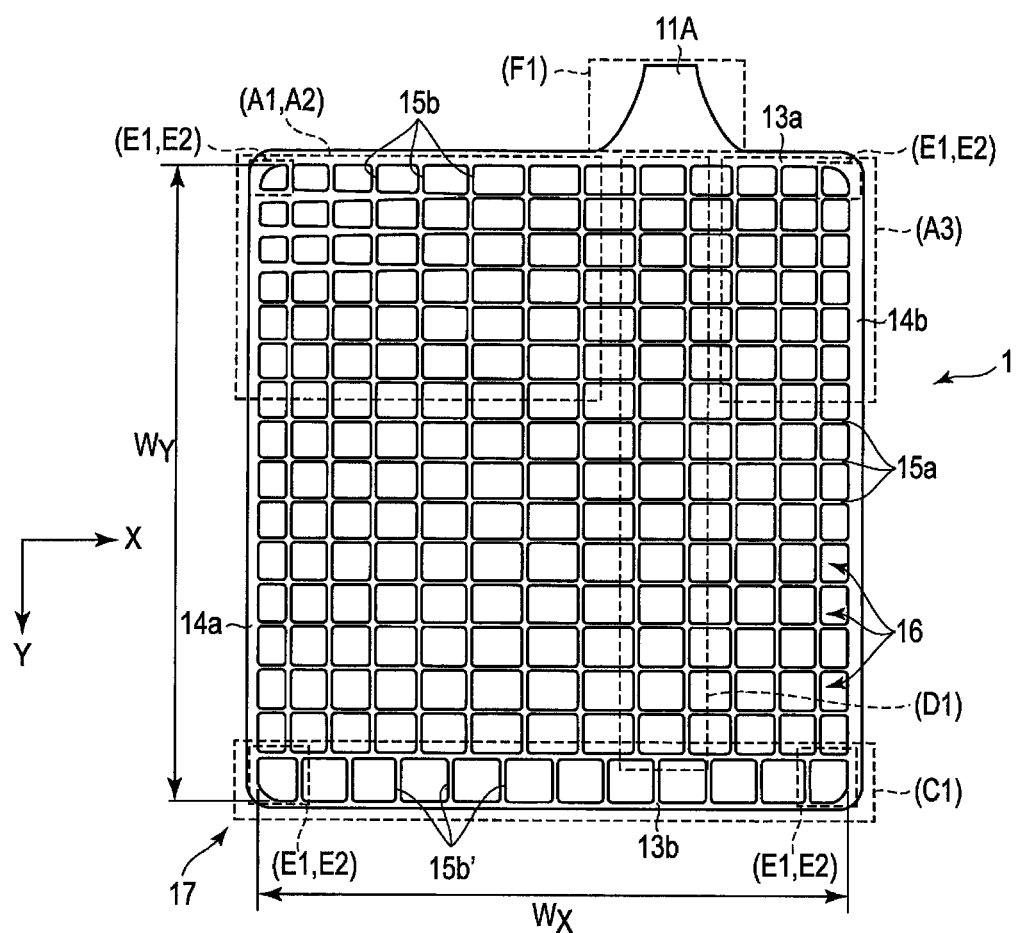
FIG. 2 is a plan view showing a positive electrode grid body according to a second embodiment.

FIG. 1 is a plan view of a positive electrode grid body 1 for a lead-acid battery according to a first embodiment.

A positive electrode grid body 1 comprises a frame rib, an inner rib disposed in the frame rib, and a positive electrode current collection lug 11A. The frame rib has a rectangular frame shape, and comprises a first lateral frame rib 13a connected the positive electrode current collection lug 11A at a position shifted from a middle position of the lateral direction X and a second lateral frame rib 13b which extend in a lateral direction X, and a first longitudinal frame rib 14a and a second longitudinal frame rib 14b which extend in a longitudinal direction Y. In the present specification, as shown in FIG. 1, the direction in which the first lateral frame rib 13a and the second lateral frame rib 13b extend is defined as the lateral direction X, and the direction in which the first longitudinal frame rib 14a and the second longitudinal frame rib 14b extend is defined as the longitudinal direction Y. In addition, a position at which the first lateral frame rib 13a is disposed is defined as an upper side, a position at which the second lateral frame rib 13b is disposed is defined as a lower side, a position at which the first longitudinal frame rib 14a is disposed is defined as a left side, and a position at which the second longitudinal frame rib 14b is disposed is defined as a right side.

Inner rib is disposed in the frame rib, which is connected to the frame rib and comprises a plurality of lateral crosspieces 15a and longitudinal crosspieces 15b arranged to form a grid. The plurality of lateral crosspieces 15a are connected to, for example, each of the first longitudinal frame rib 14a and the second longitudinal frame rib 14b and extend in the lateral direction X. The plurality of longitudinal crosspieces 15b are connected to each of the first lateral frame rib 13a and the second lateral frame rib 13b and extend in the longitudinal direction Y. The plurality of lateral crosspieces 15a are, for example, spaced apart from each other in the longitudinal direction Y such that their axes are arranged parallel. The plurality of longitudinal crosspieces 15b are, for example, spaced apart from each other in the lateral direction X such that their axes are arranged parallel. The plurality of longitudinal crosspieces 15b and the plurality of lateral crosspieces 15a are arranged, for example, such that their axes cross each other at right angles.

In the positive electrode grid body 1, a plurality of opening portions 16 are defined as regions surrounded by the frame rib and the plurality of lateral crosspieces 15a and longitudinal crosspieces 15b, and regions surrounded by the plurality of lateral crosspieces 15a and longitudinal crosspieces 15b. Each of the plurality of opening portions 16 has a square shape, for example, a rectangular shape or a trapezoidal shape. The shape of the plurality of opening portions 16 in planar view is not limited to the square and, for example, if oblique reinforcement crosspieces added, the opening portions may be formed in a polygon such as the other square or a triangle.

The positive electrode current collection lug 11A for the external connection of the positive electrode grid body 1 is connected to the first lateral frame rib 13a on the second longitudinal frame rib 14b side. The positive electrode current collection lug 11A has, for example, a rectangular plate shape and is connected so as to extend upwardly from the right side of the first lateral frame rib 13a shown in FIG. 1. When positive plates and negative plates are laminated to form an electrode plate group as described later, the positive electrode current collection lug 11A and a negative connection lug 11B are arranged shifted from each other in the length direction of the first lateral frame rib 13a and the collection lugs of the same polarity are arranged to overlap, in perspective view in the laminating direction of the electrode plate group. In particular, in the example shown in FIG. 1, the positive electrode current collection lug 11A and the negative connection lug 11B are arranged at laterally symmetrical positions with respect to a center line in the lateral direction X of the positive electrode grid body 1.

Among the plurality of lateral crosspieces 15a aligned from the first lateral frame rib 13a (i.e., the upper end shown in FIG. 1) toward the second lateral frame rib 13b side (i.e., the lower side shown in FIG. 1), attention is focused on the plurality of lateral crosspieces 15a located on at least the first lateral frame rib side (on the upper side) of the positive electrode grid body 1. In a region having a length of at least one opening portion 16 or more in the lateral direction X of the lateral crosspieces 15a from the first longitudinal frame rib 14a, a cross-sectional area of the plurality of lateral crosspieces 15a located on at least the first lateral frame rib 13a side becomes larger from the second longitudinal frame rib 14b side toward the portion connected to the first longitudinal frame rib 14a. Preferably, in first region AR1 defined by a section of 17% to 25% of length WY in the longitudinal direction Y of the first longitudinal frame rib 14a from the first lateral frame rib 13a to the second lateral frame rib 13b side, and a section of 20% to 45% of length WX in the lateral direction X of the lateral crosspiece 15a from the first longitudinal frame rib 14a (i.e., the left end shown in FIG. 1), the cross-sectional area of the plurality of lateral crosspieces 15a becomes larger from the second longitudinal frame rib 14b side (i.e., the right side shown in FIG. 1) to the portion connected to the first longitudinal frame rib 14a (i.e., the left side shown in FIG. 1). The configuration of the shape of the plurality of lateral crosspieces 15a is referred to as (A1). In the example shown in FIG. 1, in the first region AR1 defined by a section of approximately 25% of length WY in the longitudinal direction Y from the upper side (i.e., a section where three lateral crosspieces 15a are provided), and by a section of approximately 40% of length WX in the lateral direction X of the lateral crosspieces 15a from the left side, the cross-sectional area of the lateral crosspieces 15a becomes larger from the right side toward the left side.

Next, effects of the positive electrode grid body 1 according to the first embodiment will be explained.

As explained in the Background Art, the electrode plate group including the positive plate of the lead-acid battery is fixed to a lid or an upper part of the battery case on the upper side via the positive electrode current collection lug 11A connected to the right side of the first lateral frame rib 13a. In contrast, the electrode plate group is in contact with the bottom surface of the battery case or a saddle portion provided on the bottom surface which supports the electrode plate group, on the lower side. Therefore, on the upper right side fixed by the positive electrode current collection lug 11A and on the lower side in contact with the battery case, in the positive electrode grid body 1, growth can hardly occur since expansion toward the directions is restricted.

However, in the positive electrode grid body 1, growth can easily occur on the upper left side which is not fixed by the positive electrode current collection lug 11A and the portions on the right and left sides which are not in contact with the battery case. In particular, by growth toward the upper left direction of the positive electrode grid body 1, there is a risk that the upper end of the positive plate may contact a part of the negative electrode such as a negative electrode strap to cause internal short circuit.

In addition, a mechanism of promoting the growth, which has been found by the present inventors, will be described below. When the positive electrode grid body is deformed to expand by the growth, a positive active material may be peeled from the frame rib or the inner rib, may be dropped from the opening portions, or may make gap. If an electrolytic solution enters the gap and contacts the positive electrode grid body, the growth proceeds acceleratively since corrosion of the positive electrode grid body accompanying the charging and discharging is promoted. Hereinafter, such a remarkable progress of growth accompanying the peeling or dropping of the positive electrode active material in contact with the longitudinal frame rib of a positive electrode grid body is referred to as "accelerative growth". Generally, it is known that the degree of growth caused by the corrosion becomes greater as the cross-sectional area of the positive electrode grid body is larger. Therefore, when the peeling or falling from the positive electrode active material occurs by the outward bending of the longitudinal frame rib of the positive electrode grid body, not only the deterioration of the battery performance such as the discharge capacity and output characteristics, but also the accelerative growth in the longitudinal direction is caused.

In addition, if the positive electrode active material and the positive electrode grid are in close contact with each other, a corrosion layer necessary for bonding is formed between the positive electrode active material and the positive electrode grid body surface. When the corrosion layer is interposed between the positive electrode active material and the positive electrode grid body, the growth of the positive electrode grid is suppressed since a tensile force by positive electrode active material to pull the positive electrode grid body exerts. In the state in which peeling or dropping has occurred, however, the above-mentioned action does not exert and the accelerative growth is promoted.

In the positive electrode grid body 1 according to the first embodiment, the cross-sectional area of the plurality of lateral crosspieces 15a disposed in the first region AR1 becomes larger from the second longitudinal frame rib 14b side (right side) to a portion connected to the first longitudinal frame rib 14a. Therefore, even if the upward growth occurs on the side on which the positive electrode current collection ear 11A is not connected to the first lateral frame rib 13a (that is, the left side shown in FIG. 1), the mechanical strength of the plurality of lateral crosspieces 15a in the first region AR1 on the upper left side of the positive electrode grid body 1 can be increased. That is, the plurality of lateral crosspieces 15a in the first area AR1 can be reinforced. Therefore, the upward bending of the plurality of lateral crosspieces 15a accompanying the growth can be prevented, and an internal short circuit caused by the contact between the positive plate and a part of the negative electrode such as the negative plate or the negative plate strap can be suppressed. Similarly, the plurality of lateral crosspieces 15a having the large cross-sectional area are less likely to be broken caused by corrosion, and can also resist the tensile force toward the left side. For this reason, by preventing the outward bending of the first longitudinal frame rib 14a and the peeling or dropping of the positive electrode active material, the upward accelerative growth can also be suppressed. Since the above-described peeling or dropping of the positive electrode active material occurs substantially in units of one square of the opening portions 16 of the positive electrode grid body 1, reinforcement of the plurality of lateral crosspieces 15a should preferably be performed in units of an average width of one square of the plurality of openings 16. In addition, since the plurality of lateral crosspieces 15a are not reinforced on the center side of positive electrode grid body 1 which has little influence on internal short circuit accompanying the upward growth of the positive plate, that is, since the cross-sectional area is not increased on the center side, the weight reduction of the lead-acid battery is not impaired.

Furthermore, the present inventors found that by forming the opening portions 16 to become small as in the first embodiment, an effect of suppressing peeling or dropping of the positive electrode active material by an operation described below can be obtained. According to the first embodiment, in the first region AR1 on the upper left side of the positive electrode grid body 1, by increasing the cross-sectional area of the plurality of lateral crosspieces 15a (in FIG. 1, increasing the width of the lateral crosspieces 15a), the area of the opening portions 16 in the first region AR1 becomes smaller than that of the other opening portions 16. The ratio of the surface area of the positive electrode grid body 1 in contact with the positive electrode active material filled into the small opening portions 16 becomes larger than that of the positive electrode active material filled into the other larger opening portions 16. For this reason, the adhesion between the positive electrode grid body 1 and the positive electrode active material can be enhanced, and the peeling or falling of the positive electrode active material can be suppressed.

Thus, in the positive electrode grid body 1 according to the first embodiment, the peeling or dropping of the positive electrode active material can be suppressed, and the bending of the inner rib in the first region AR1 disposed under the negative electrode current collection lug 11B can be prevented. As a result, the degradation of the battery performance such as discharge capacity and output characteristics can be prevented, and the growth toward the upper left side, which is a direct cause of the internal short circuit, can be particularly suppressed. Furthermore, in the positive electrode grid body 1 according to the first embodiment, since the reinforced portions where the cross-sectional areas of the plurality of lateral crosspieces 15a are increased are applied only to the portions necessary for suppression of the growth and not on the center side, it is possible to achieve both the longer life and weight reduction of the positive electrode grid body.

Note that the frame rib, the inner rib comprising the plurality of lateral crosspieces 15a and the longitudinal crosspieces 15b, and the positive electrode current collection lug 11A, which constitute the positive electrode grid body 1, are formed of, for example, lead or a lead alloy, and are formed integrally. The metal elements to be added to the lead alloy are not limited, and known elements can be used. In particular, addition of a predetermined amount of Ca, Sn, Al or Ag is more preferable in suppression of the deformation caused by the growth since the mechanical strength and the corrosion resistance of the positive electrode grid body 1 can be thereby improved. The positive electrode grid body 1 can be produced, for example, as a punched grid body of a rolled plate formed of lead or a lead alloy, an expanded grid body, or a rolled plate cut out by a discharge wire cutting method or the like. In addition, the grid body may be produced as a cast grid body by the book mold method, etc. In particular, the growth of the positive electrode grid body 1 is likely to occur in a grid body formed of a rolled plate in which crystal grains containing lead or a lead alloy are oriented. For this reason, the effect of suppressing the growth is remarkably obtained in a punched grid body, an expanded grid body, or a grid body produced by a discharge wire cutting method from a rolled plate, or the like.

In addition, "the cross-sectional area of the crosspieces 15a becomes larger" indicates that the cross-sectional area is increased continuously and/or stepwise. That is, as in the example shown in FIG. 1, the cross-sectional area of the plurality of lateral crosspieces 15a may become larger with a constant taper angle continuously from the right side to the left end. And, the cross-sectional of the plurality of lateral crosspieces 15a may become larger in several stages such that a portion where the same cross-sectional area continues for a certain distance discontinuously from the right side to the left end.

Furthermore, in the example shown in FIG. 1, the positive electrode grid body 1 in which the plurality of lateral crosspieces 15a in the first region AR1 have the same shape is illustrated, but the shape of the plurality of lateral crosspieces 15a is not limited thereto. More specifically, the plurality of lateral crosspieces 15a may have different shapes each other, for example, may be formed such that rate of the cross-sectional area is different from each other by changing the length of a section where changing the cross-sectional area or the taper angle. For example, one of the cross-sectional areas of the plurality of lateral crosspieces 15a may be changed stepwise, and the others of that may be changed continuously. In addition, according to "the cross-sectional area of the crosspieces 15a becomes larger", for example, the width of the plurality of crosspieces 15a may be increased as the example shown in FIG. 1, or the thickness of the plurality of lateral crosspieces 15a may be increased.

In the first embodiment, the cross-sectional area of the lateral crosspieces 15a is specified in the first region defined by specific sections in the lateral direction and the longitudinal direction of the inner rib. In the first embodiment, in a region defined by a section of the length of the inner rib along the first longitudinal frame rib 14a and a section of 20% to 45% of the length of the lateral crosspiece 15a from the first longitudinal frame rib 14a, the cross-sectional areas of the plurality of lateral crosspieces 15a may become larger from the side of the second longitudinal frame rib 14b toward the portion connected to the first longitudinal frame rib 14a. In such a configuration, since all the lateral crosspieces 15a have the cross-sectional area increased at the connection portion of the first longitudinal frame rib 14a, the mechanical strength can be increased, that is, the number of reinforced lateral crosspieces 15a can be increased as compared with a case where the lateral crosspieces 15a disposed in the first region AR1 have the increased cross-sectional area at the connection portion of the first longitudinal frame rib 14a. For this reason, it is possible to further promote the effects of preventing the upward bending of the plurality of lateral crosspieces 15a accompanying the growth and suppressing internal short circuit caused by contact between the positive plate and a part of the negative electrode such as the negative plate or the negative electrode strap, and the like.

However, when the cross-sectional area of all the lateral crosspieces 15a is increased at the connection portion of the first longitudinal frame rib 14a, the portion increasing the cross-sectional area of the positive electrode grid body 1 becomes larger, and the weight reduction of the positive electrode grid body 1 is impaired since the weight increases accordingly.

On the contrary, by limiting the lateral crosspieces 15a where the cross-sectional area becomes larger at the connection portion with the first longitudinal frame rib 14a to the first region AR1, the part of the positive electrode grid body 1, where the cross-sectional area is increased, is decreased, the weight decreases accordingly, and the weight reduction of the positive electrode grid body 1 is not impaired.

Second Embodiment

A positive electrode grid body according to a second embodiment will be explained with reference to the drawings. The same components as those of the first embodiment are denoted by the same reference numerals, and their descriptions are omitted.

FIG. 2 is a plan view showing a positive electrode grid body 1 according to the second embodiment. The positive electrode grid body 1 according to the second embodiment comprises the following (A2), (A3), (B1) to (B3), (C1), (D1), (E1), (E2), (F1), and (G1) in addition to the configuration (A1) described in the first embodiment. In FIG. 2, the portions in which, of these, configurations (A1) to (A3), (C1), (D1), (E1), (E2), (F1), and (G1) are particularly shown are represented by dotted lines with reference numerals. FIG. 3 to FIG. 7 are enlarged plan views showing the portions where the configurations shown in FIG. 2 are particularly represented.

(A) Shape of Lateral Crosspieces 15a (A1) In a first region defined by a section of 17% to 25% of length $W_Y$ of a first longitudinal frame rib 14a in a longitudinal direction Y from a first lateral frame rib 13a to a second lateral frame rib 13b side, and a section of 20% to 45% of length $W_X$ in the lateral direction X of a plurality of lateral crosspieces 15a from the first longitudinal frame rib 14a side, the cross-sectional area of the plurality of lateral crosspieces 15a becomes larger from the side of a second longitudinal frame rib 14b toward a portion connected to the first longitudinal frame rib 14a.

(A2) Among the plurality of lateral crosspieces 15a located in the first region described in (A1), the cross-sectional area at a portion connected to the first longitudinal frame rib 14a becomes larger as the lateral crosspiece 15a closer to the first lateral frame rib 13a side. At the same time, a section of variation of the cross-sectional area becomes longer as the lateral crosspiece 15a closer to the first lateral frame rib 14a, and the section of variation becomes shorter stepwise from the first lateral frame rib 13a to the second lateral frame rib 13b side. The section of variation of the cross-sectional area is a section where cross-sectional area is larger from of the second longitudinal frame rib 14b side toward the portion connected to the first longitudinal frame rib 14a, which has, for example, a tapered shape.

(A3) At least in a second region defined by a section of 17% to 25% of length $W_Y$ of the first longitudinal frame rib 14a, and a section to 10% to 30% of length $W_X$ in the lateral direction X of the lateral crosspieces 15a from the second longitudinal frame rib 14b side, the cross-sectional area of the plurality of lateral crosspieces 15a becomes larger from the first longitudinal frame rib 14a side toward a portion connected to the second longitudinal frame rib 14b.

(B) Area of the Opening Portions 16

(B1) The average area of the plurality of opening portions 16 in planar view, which are adjacent to the first longitudinal frame rib 14a and the second longitudinal frame rib 14b, is smaller than the average area of a remaining plurality of opening portions 16 excluding the plurality of opening portions 16 in planar view.

(B2) The area of the plurality of opening portions 16 in planar view becomes smaller stepwise from the second lateral frame rib 13b side to the first lateral frame rib 13a side. In addition, the average area of the plurality of opening portions 16 in planar view, which are adjacent to the first longitudinal frame rib 14a and the second longitudinal frame rib 14b, is smaller than the average area of the plurality of remaining opening portions 16 excluding the plurality of opening portions 16 in planar view.

(B3) The area of the plurality of opening portions 16 in planar view becomes smaller stepwise from the center side of positive electrode grid body 1 (inner rib) toward the first longitudinal frame rib 14a side, and smaller stepwise from the center side of the positive electrode grid body 1 (inner rib) toward the second longitudinal frame rib 14b side.

(C) First Opening Portion Group 17

(C1) Among the plurality of opening portions 16, a plurality of opening portions 16 adjacent to the second lateral frame rib 13b are a first opening portion group 17, and at least parts of a plurality of longitudinal crosspieces 15b' defining the first opening portion group 17 are arranged shifted in a lateral direction X from the longitudinal crosspieces 15b defining the plurality of opening portions 16 adjacent to the first opening portion group 17 in the lateral direction Y.

(D) Shape of Longitudinal Crosspieces 15b (D1) The cross-sectional area of the plurality of longitudinal crosspieces 15b disposed directly under the positive electrode current collection lug 11A becomes larger continuously or stepwise from the second lateral frame rib 13b side to the first lateral frame rib 13a, and becomes largest at the portion connected to the first lateral frame rib 13a.

(E) Shape of Opening Portions 16

(E1) The four corners of the plurality of opening portions 16 formed in the positive electrode grid body 1 in planar view have rounds R.

(E2) Among the plurality of opening portions 16 adjacent to the frame rib, large rounds R are formed at four corners of the opening portions 16 located at least the four corners of the frame rib in planar view as compared with the opening portions 16 located at portions other than the four corners of the frame rib. In the opening portions 16 located at four corners of the frame rib, a size of the round R of the corner closest to the corner of the frame rib in the opening portion 16 is the largest.

(F) Shape of Positive Collection Lug 11A (F1) The positive electrode current collection lug 11A is formed such that its width becomes larger stepwise from an end 11Bb opposite to a connection end 11Ba with the first lateral frame rib 13a toward a connection end 11Ba.

(G) Elements added to Lead Alloy (G1) The positive electrode grid body 1 is formed of a lead alloy containing 0.02 to 0.08 mass % of Ca, 0.4 to 2.5 mass % of Sn, 0.005 to 0.04 mass % of Al, 0.001 to 0.0049 mass % of Ag, the balance being Pb and unavoidable impurities.

The above mentioned characteristics (A) to (G) will be described below with reference to the drawings.

(A) Shape of Lateral Crosspieces 15a (A1) Configuration (A1) of the positive electrode grid body 1 according to the second embodiment will be explained with reference to FIG. 2. In the example shown in FIG. 2, a plurality of lateral crosspieces 15a located at least up to 25% of the length $W_Y$ of the longitudinal crosspieces 15b in the longitudinal direction Y from the first lateral frame rib 13a toward the second lateral frame rib 13b side are formed such that the cross-sectional area becomes larger from the second longitudinal frame rib 14b side (i.e., right side in FIG. 1) of the first region to the first longitudinal frame rib 14a side (i.e., left side in FIG. 1). In addition, in the example of FIG. 2, the first region is defined by a section of 25% of the length $W_Y$ in the longitudinal direction Y of the first longitudinal frame rib 14a from the first lateral frame rib 13a toward the second lateral frame rib 13b side and by a section of approximately 45% of the length $W_X$ in the lateral direction X of the lateral crosspieces 15a from the first longitudinal frame rib 14a. In addition, in FIG. 2, in a section of approximately 20% of the length $W_X$ in the lateral direction X of the plurality of lateral crosspieces 15a, the plurality of lateral crosspieces 15a located below the first region are formed such that the cross-sectional area becomes larger from the second longitudinal frame rib 14b side to the first longitudinal frame rib 14a.

Since the positive electrode grid body 1 according to the second embodiment has the configuration of (A1) as described above, the same effects as those of the first embodiment can be obtained. Furthermore, in the example shown in FIG. 2, as compared with the example shown in FIG. 1, in a predetermined region, all the lateral crosspieces 15a are formed such that the cross-sectional area becomes larger from the right side to the part connected to the first longitudinal frame rib 14a on the left side. For this reason, the mechanical strength of all of the plurality of lateral crosspieces 15a located on the first longitudinal frame rib 14a side (the side away from the connection portion to the positive electrode current collection lug 11A) can be increased and, even if upward growth occurs on the left side of the positive electrode grid body 1, upward bending of the plurality of lateral crosspieces 15a caused by growth can be prevented. As a result, an internal short circuit caused by the contact between the positive plate and a part of the negative electrode such as the negative plate or the negative electrode strap can be suppressed remarkably. Similarly, the plurality of lateral crosspieces 15a having the cross-sectional area made larger are unlikely to be broken caused by corrosion, and can also resist the tensile force to the left side of the positive electrode grid body 1. As a result, the outward bending of the first longitudinal frame rib 14a can be prevented, and the upward accelerative growth can also be suppressed remarkably.

Since the first region where the cross-sectional area of the plurality of lateral crosspieces 15a is made larger is defined by a section of 17% to 25% of length $W_Y$ in the longitudinal direction Y of the first longitudinal frame rib 14a from the first lateral frame rib 13a toward the second lateral frame rib 13b side and a section of 20% to 45% of the length $W_X$ in the lateral direction X of the lateral crosspieces 15a from the first longitudinal frame rib 14a, the effect of achieving both the growth suppression and the weight reduction of the positive electrode grid body 1 is achieved.

(A2) Configuration (A2) of the positive electrode grid body 1 according to the second embodiment will be explained with reference to FIG. 2 and FIG. 3. FIG. 3 is an enlarged view of the part surrounded with symbol (A1, A2) in FIG. 2. Among the plurality of lateral crosspieces 15a located in the first region described in (A1), the cross-sectional area at a portion connected to the first longitudinal frame rib 14a becomes larger as the lateral crosspiece 15a closer to the first lateral frame rib 13a. At the same time, as the lateral crosspiece 15a closer to the first lateral frame rib 13a, a section of variation of the cross-sectional area of the lateral crosspiece 15a becomes longer, and the section of variation becomes shorter stepwise from the first lateral frame rib 13a to the second lateral frame rib 13b side. More specifically, the cross-sectional area of the portion of the y-th crosspiece 15a counted from the top, which is connected to the first longitudinal frame rib 14a, becomes larger over a longer section as compared to that of the y+1-th lateral crosspiece 15a. In addition, the plurality of lateral crosspieces 15a arranged in the first region are formed such that the average cross-sectional area becomes larger over a longer section as the lateral crosspieces 15a arranged on the upper side as a whole.

Since the positive electrode grid body 1 according to the second embodiment comprises configuration (A2) in addition to configuration (A1) as described above, the mechanical strength against the deformation toward the left side (first longitudinal frame rib 14a side) and the upper side (first lateral frame rib 14a side) of the positive electrode grid body 1 can be further improved. Therefore, an internal short circuit caused by the contact between the positive plate and a part of the negative electrode such as the negative plate or the negative electrode strap can be suppressed more remarkably. In addition, since the plurality of lateral crosspieces 15a located on the center side of the positive electrode grid body 1 which has little influence on the suppression of growth toward the left, right, and upper sides of the positive plate are not reinforced, that is, since the cross-sectional area is not increased, the weight reduction of the lead-acid battery is not impaired.

(A3) Configuration (A3) of the positive electrode grid body 1 according to the second embodiment will be explained with reference to FIG. 2 and FIG. 4. FIG. 4 is an enlarged view of the part surrounded with symbol (A3) in FIG. 2. In a second region defined by a section of 17% to 25% of the length in the longitudinal direction Y of the second longitudinal frame rib 14b from the first lateral frame rib 13a toward the second lateral frame rib 13b side, and a section of 10% to 30% of the length in the lateral direction X of the lateral crosspieces 15a from the second longitudinal frame rib 14b, the plurality of lateral crosspieces 15a described in (A3) are formed such that the cross-sectional area becomes larger from the first longitudinal frame rib 14a toward the portion connected to the second longitudinal frame rib 14b.

In FIG. 2, the configuration of the plurality of lateral crosspieces 15a described in (A1) and configuration (A3) will be described together. Each of the plurality of lateral crosspieces 15a located in the first region is formed such that the cross-sectional area becomes larger from the second longitudinal frame rib 14b side toward the portion connected to the first longitudinal frame rib 14a. In addition, the plurality of lateral crosspieces 15a located in the second region are formed such that the cross-sectional area becomes larger from the center side toward the portion connected to the second longitudinal frame rib 14b. Furthermore, in the central region between the first region and the second region, each of the plurality of lateral crosspieces 15a is formed such that cross-sectional area is constant. That is, the plurality of lateral crosspieces 15a are formed such that the cross-sectional area becomes larger from the center side toward the right and left sides.

Since the positive electrode grid body 1 according to the second embodiment shown in FIG. 2 comprises configuration (A3) in addition to configuration of (A1) as described above, the cross-sectional area of the lateral crosspiece 15a becomes larger from the left side to the right side as compared with the positive electrode grid body 1 according to the first embodiment shown in FIG. 1. As a result, the mechanical strength of the positive electrode grid body 1 located more closely to the right side than to the position of the positive electrode current collection lug 11A connected to the first lateral frame rib 13a is higher than the mechanical strength of the positive electrode grid body 1 located on the center side. For this reason, even if the upward growth occurs on the right side with respect to the positive electrode current collection lug 11A, it is possible to prevent the right side portions of the plurality of lateral crosspieces 15a from the upward bending caused by the growth. As a result, for example, internal short circuit caused by bridge short circuit, etc., accompanied by deposition of dropping active material in the upper right portions of the positive plate and the negative plate is significantly suppressed. At the same time, in the second region on the right side of the positive electrode grid 1, a plurality of lateral crosspieces 15a is formed such that the cross-sectional area becomes larger from the center side toward the right side are less likely to be broken due to corrosion and can resist against tensile force toward the right side. For this reason, the outward bending of the second longitudinal frame rib frame rib 14b is prevented, and the accelerative growth to an upper side is also suppressed remarkably. Furthermore, in the positive electrode grid body 1 according to the second embodiment, since the plurality of lateral crosspieces 15a located on the center side of the positive electrode grid body 1 which has little influence on the suppression of growth toward the left, right, and upper sides of the positive plate are not reinforced, that is, since the cross-sectional area is not increased, the weight reduction of the lead-acid battery is not impaired. In particular, since the second region where the cross-sectional area of the plurality of lateral crosspieces 15a becomes larger at the connection portion of the second longitudinal frame rib 14b is defined by a section of 10% to 30% of the length in the lateral direction X of the plurality of lateral crosspieces 15a from the second longitudinal frame rib 14b, both the growth suppression and the weight reduction can be achieved.

In the second embodiment, the lateral crosspieces 15a is reinforced in the second region, but, if further weight reduction of the positive electrode grid body 1 is required, a sufficient reinforcement effect can also be obtained by setting the length in the longitudinal direction of the second region, that is, the length in the longitudinal direction Y of the second longitudinal frame rib 14b from the first lateral frame rib 13a toward the second lateral frame rib 13b side to be the same as at least the first region. More specifically, the length in the longitudinal direction of the second region is preferably set to be 17% to 25% of the length $W_Y$ in the longitudinal direction Y of the second longitudinal frame rib 14b from the first lateral frame rib 13a toward the second lateral frame rib 13b side, for the weight reduction.

When the first region and the second region are compared, the area of the first region is preferably larger than the area of the second region. The reason is that the first region located on the left side of the positive electrode grid body 1 is deformed more largely by growth than the second region located on the right side of the positive electrode grid body 1 where the positive electrode current collection lug 11A is connected. In addition, for the same reason, when the average value of the cross-sectional area of the lateral crosspieces 15a in the first region is compared with the average value of the cross-sectional area of the lateral crosspieces 15a in the second region, setting the average value of the cross-sectional area of the lateral crosspieces 15a in the first region to be larger is preferable in suppression of growth.

In the second embodiment, the cross-sectional area of the lateral crosspieces 15a is specified in the second region defined by specific sections in the lateral direction and the longitudinal direction of the inner rib. In the second embodiment, in a region defined by a section of the length of the inner rib along the second longitudinal frame rib 14b, and a section of 10% to 30% of the length of the lateral crosspiece 15a from the second longitudinal frame rib 14b, the cross-sectional area of the plurality of lateral crosspieces 15a may be increased from the first longitudinal frame rib 14a side toward the portion connected to the second longitudinal frame rib 14b. In such a configuration, since all the lateral crosspieces 15a have a large cross-sectional area at the connection portion with the second longitudinal frame rib 14b, the number of crosspieces 15a having increased mechanical strength can be increased as compared with a case where the lateral crosspieces 15a disposed in the second region have a large cross-sectional area at the connection portion of the second longitudinal frame rib 14b. For this reason, the effects of preventing the upward bending of the plurality of lateral crosspieces 15a caused by the growth, suppressing internal short circuit caused by contact between the positive plate and a part of the negative electrode such as the negative plate or the negative electrode strap, and the like can be further promoted.

However, when the cross-sectional area of all the lateral crosspieces 15a is increased at the connection portion to the second longitudinal frame rib 14b, the portion where the cross-sectional area of the positive electrode grid body 1 is made larger increases, and the weight increases accordingly, and the weight reduction of the positive electrode grid body 1 is impaired.

On the other hand, by limiting the lateral crosspieces 15a where the cross-sectional area is made larger at the connection portion of the second longitudinal frame rib 14b to the second region, the part of the positive electrode grid body 1 where the cross-sectional area is made larger is decreased, the weight is reduced accordingly, and the weight reduction of the positive electrode grid body 1 is not impaired.

(B) Area of the Opening Portions 16

(B1) Configuration (B1) of the positive electrode grid body 1 according to the second embodiment will be explained with reference to FIG. 2 and FIG. 3. In configuration (B1), the average area in planar view of the plurality of opening portions 16 adjacent to the first longitudinal frame rib 14a and the plurality of opening portions 16 adjacent to the second longitudinal frame rib 14b is smaller than the average area of the plurality of remaining opening portions 16 excepting the plurality of opening portions 16.

Thus, by setting the average area of at least the plurality of opening portions 16 adjacent to the first longitudinal frame rib 14a and the plurality of opening portions 16 adjacent to the second longitudinal frame rib 14b in planer view to be smaller than the average area of the remaining plurality of opening portions 16 excepting the plurality of opening portions 16, in the positive electrode active material filled into the plurality of opening portions 16, the rate of contacting with the positive electrode grid body 1 per constant area is larger than the positive electrode active material filled into the other plurality of opening portions 16. Therefore, the adhesion between the positive electrode active material filled into the plurality of opening portions 16 and the positive electrode grid body 1 is improved as compared to other portions, and peeling or falling of the positive electrode active material can be suppressed. Therefore, the degradation of the battery performance such as discharge capacity and output characteristics, accompanying peeling or falling of the cathode active material filled in the plurality of opening portions 16, can be suppressed. At the same time, it is possible to prevent accelerative growth of the first longitudinal frame rib 14a and the second longitudinal frame rib 14b of the positive electrode grid body 1.

To reduce the area of the opening portions 16 of the positive electrode grid body 1 in planar view, for example, methods of increasing the width of the frame rib, the lateral crosspieces 15a or the longitudinal crosspieces 15b forming the opening portions 16, or increasing the number of lateral crosspieces 15a or longitudinal crosspieces 15b in the same area, and the like can be conceived. However, since both of them are in a trade-off relationship with the weight increase of the positive electrode grid body 1, parts of the reduced average area of the opening portions 16 in planar view are desirably limited to parts adjacent to the first longitudinal frame rib 14a and the second longitudinal frame rib 14b.

(B2) Next, configuration (B2) of the positive electrode grid body 1 according to the second embodiment will be explained with reference to FIG. 2 and FIG. 3. In the configuration of (B2), the area of the plurality of opening portions 16 in planar view becomes smaller stepwise from the frame rib 13b side toward the first lateral frame rib 13a side as compared on the same perpendicular line that longitudinally crosses the first lateral frame rib 13a and the second lateral frame rib 13b. That is, in the example shown in FIG. 2 and FIG. 3, the area of one opening portion 16 located at the y'-th position from the upper side on the same perpendicular line is made smaller than the area of the opening portion 16 located at the y'+1-th position on the same perpendicular line. The area of the plurality of opening portions 16 arranged continuously and longitudinally on the same perpendicular line becomes desirably smaller stepwise from the second lateral frame rib 13b side toward the first lateral frame rib 13a side, by 0.85 times or more and not more than 0.99 times of the area of the opening portion 16 of the second lateral frame rib 13b side. In addition, the average area in planar view of the plurality of opening portions 16, which are adjacent to the first longitudinal frame rib 14a and the second longitudinal frame rib 14b is smaller than the average area of the plurality of remaining opening portions 16 excluding the plurality of opening portions 16.

Next, effects of configuration (B2) will be described.

As described above, in the positive electrode grid body 1 according to the second embodiment comprising configuration of (B2), the area of the plurality of opening portions 16 in planar view becomes smaller stepwise from the lateral frame rib 13b side toward the first lateral frame rib 13a side as compared on the same perpendicular line that longitudinally crosses the first lateral frame rib 13a and the second lateral frame rib 13b. As described above, in the opening portion 16 having a small area on the upper side of the positive electrode grid 1, as in the configuration (B1), in the positive electrode active material filled into the plurality of opening portions 16, the ratio of contacting with the positive electrode grid body 1 per a certain area is increased as compared with that in the opening portion 16 having a large area located on the lower side of the positive electrode grid body 1. For this reason, the adhesion between the positive electrode active material filled into the opening portions 16 and the positive electrode grid body 1 is improved, and accelerative growth of the positive electrode grid body 1 can be prevented. Among an area ratio of a plurality of opening portions continuous longitudinally, it is desirable that, the area of the upper opening portion 16 to the lower opening portion 16 is 0.85 times or more and not more than 0.99 times, that is, the area ratio of (upper opening portion)/(lower opening portion) is 0.85 to 0.99 for preventing the accelerative growth. If the area ratio exceeds 0.99 times, since the area difference between the upper side and the lower side of the positive electrode grid body 1 is small, the effect of selectively increasing the reinforcement on the upper side of the positive electrode grid body 1 becomes small. In addition, if the area ratio is less than 0.85 times, the filling property of the positive electrode active material is improved by making the upper opening portion 16 of the positive electrode grid body 1 smaller, but the lower opening portion 16 becomes relatively larger, and the output characteristics and the retention of the positive electrode active material may be reduced.

Next, the effect that deformation of the positive electrode grid body 1 caused by expansion and contraction of the positive electrode active material is suppressed by the configuration (B2) of the positive electrode grid body 1 according to the second embodiment will be described.

When the positive electrode active material expands and contracts due to charging and discharging, the expansion and contraction force is propagated from the central portion toward the outer peripheral portion in the positive electrode grid body. According to the research by the inventors, it has been found that a large elongation particularly occurs in the first and second longitudinal frame ribs as a sum of the propagation, and peeling or dropping of the positive electrode active material easily occurs at the opening portions adjacent to the first and second longitudinal frame ribs. As described in the configuration (B1) explained above, peeling or dropping can be suppressed to a certain extent by reducing the area in planar view of the plurality of opening portions adjacent to the first and second longitudinal frame ribs. Furthermore, it has been found that, by becoming smaller the area difference (volume difference in a case where the thickness of the positive electrode grid body is constant) in planar view of the opening portions arranged continuously in a longitudinal direction on a same perpendicular line, the interface stress can be alleviated, which is generated between the opening portions by the difference between the expansion force and the contraction force of the positive electrode active material of the opening portions arranged continuously in a longitudinal direction, and peeling or dropping of the positive electrode active material can be suppressed more remarkably.

For this reason, by setting the area of the plurality of opening portions 16 in planar view to be smaller from the lower second lateral frame rib 13b side toward the upper first lateral frame rib 13a side on the same perpendicular line in FIG. 2 and FIG. 3, on the upper side of the positive electrode grid body 1 where accelerative growth is likely to occur easily and where expansion and contraction of the positive electrode active material are significant, an interface stress generated between the surface of the positive electrode grid body 1 and the positive electrode active material between the opening portions 16 can be alleviated, and peeling or dropping of the positive electrode active material can be prevented.

Moreover, in the configuration (B2), since the number of lateral crosspieces 15a and the longitudinal crosspieces 15b occupying the positive electrode grid 1 relatively increases toward the upper side of the positive electrode grid body 1, the mechanical strength on the upper side of the positive electrode grid body 1 is improved. Therefore, even if the growth occurs upwardly, the upward bending can be suppressed as the lateral crosspieces 15a located on the upper side of the positive electrode grid body 1, and an internal short circuit caused by the contact between the upper part of the positive plate and a part of the negative electrode such as the negative plate or the negative electrode strap can be suppressed. In addition, since the number of lateral crosspieces 15a and longitudinal crosspieces 15b in the positive electrode grid body 1 are relatively reduced on the lower side of the positive electrode grid body 1 where influence of expansion and contraction of the positive electrode active material is little, the weight reduction of the lead-acid battery is not impaired.

When the area of the plurality of opening portions 16 becomes smaller stepwise from the lower side to the upper side, a first opening portion group 17 to be described below may not be provided in the plurality of opening portions 16.

That is, the opening portion 16 constituting the first opening portion group 17 may have the same area as the opening portion 16 adjacent on the upper side thereof.

(B3) Configuration (B3) of the positive electrode grid body 1 according to the second embodiment will be explained with reference to FIG. 2. In the positive electrode grid body 1 comprising the configuration (B3), the area of the plurality of opening portions 16 in planar view becomes smaller stepwise from the center side of the positive electrode grid body 1 toward the first longitudinal frame rib 14a side, and from the center side of the positive electrode grid body 1 toward the second longitudinal frame rib 14b side. That is, in the positive electrode grid body 1, the area of the plurality of opening portions 16 in planar view is smaller stepwise from the center side of the positive electrode grid body 1 toward the right and left ends. According to such a configuration, peeling or dropping of the positive electrode active material in the vicinity of the first and second longitudinal frame ribs 14a and 14b located at both the right and left ends of the positive electrode grid body 1 can be prevented, similarly to the advantage achieved by the configuration (B2) of the positive electrode grid body 1.

To partially reduce the area of the opening portions 16 of the above-described positive electrode grid body 1 in planar view, for example, it is conceivable to expand the width of the frame rib, the lateral crosspieces 15a or the longitudinal crosspieces 15b forming the opening portions 16, or to increase the number of lateral crosspieces 15a and longitudinal crosspieces 15b of the inner rib in the same area, and the like. However, since all of them are in a trade-off relationship with the increase in weight of the positive plate, it is desirable to selectively apply reinforcement to partially reduce the area of the opening portions 16 in planar view at necessary parts. For example, in the second embodiment shown in FIG. 2, each of intervals of the plurality of longitudinal crosspieces 15b becomes smaller stepwise from the center side of the positive electrode grid body 1 to the first longitudinal frame rib 14a side, and from the center side of the positive electrode grid body 1 toward the second longitudinal frame rib 14b side. At the same time, each of the plurality of lateral crosspieces 15a is formed such that the cross-sectional area becomes larger from the second longitudinal frame rib 14b side toward the portion connected to the first longitudinal frame rib 14a.

Furthermore, in the configuration (B3), since the number of lateral crosspieces 15a and longitudinal crosspieces 15b occupying the positive electrode grid body 1 is increased relatively toward both the right and left ends of the positive electrode grid body 1, the mechanical strength at both the right and left ends in the lateral direction X is improved. As a result, even if growth occurs in the lateral direction X of the positive electrode grid body 1, the bending to the outer side of the plurality of longitudinal crosspieces 15b can be prevented, and peeling or dropping of the positive electrode active material located on both the right and left ends of the positive electrode grid body 1 can be prevented more effectively. The accelerative growth of the positive electrode grid body 1 can be therefore suppressed.

In addition, in the positive electrode grid body 1 comprising configuration (B3), since the number of lateral crosspieces 15a and longitudinal crosspieces 15b in the positive electrode grid body 1 are relatively reduced on the center side of the positive electrode grid body 1, which has little influence of expansion and contraction of the positive electrode active material, the weight reduction of the lead-acid battery is not impaired.

(C) First Opening Portion Group 17

Figure 5:
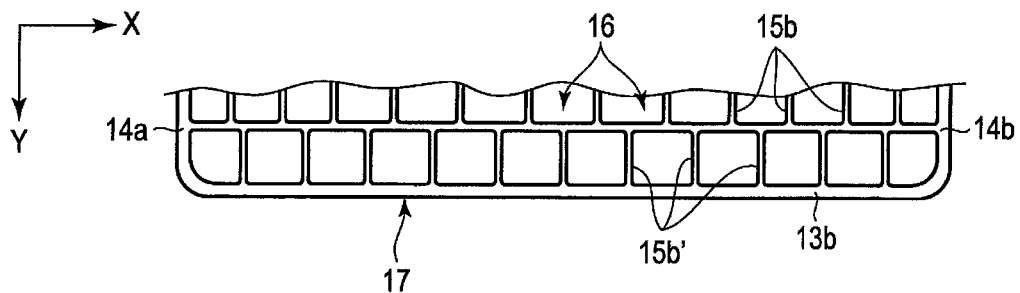
FIG. 5 is a partially enlarged plan view showing the positive electrode grid body shown in FIG. 2.

(C1) Configuration (C1) of the positive electrode grid body 1 according to the second embodiment will be explained with reference to FIG. 2 and FIG. 5. FIG. 5 is an enlarged view of the part surrounded with symbol (C1) in the positive electrode grid body 1 in FIG. 2. Among the plurality of opening portions 16, a plurality of opening portions 16 adjacent to the second lateral frame rib 13b are referred to as a first opening portion group 17. At least parts of a plurality of longitudinal crosspieces 15b' defining the first opening portion group 17 are arranged shifted in a lateral direction X from the plurality of longitudinal crosspieces 15b defining the plurality of opening portions 16 adjacent to the first opening portion group 17 in the lateral direction Y. That is, in the configuration (C1), the longitudinal crosspieces 15b are at least partially connected in an inverted T shape to the lateral crosspieces 15a defining the upper side of the first opening portion group 17.

Since the positive electrode grid body 1 according to the second embodiment comprises the configuration (C1), even if growth occurs and the plurality of longitudinal crosspieces 15b extend downward, at the intersection where the longitudinal crosspieces 15b and the lateral crosspieces 15a defining the upper side of the opening portion group 17 are connected in an inverted T shape, the lateral crosspieces 15a can bent downward with the nearby longitudinal crosspieces 15b' as a fulcrum to absorb the displacement due to the extension. As a result, since the extension of the plurality of longitudinal crosspieces 15b to the lower side is absorbed by the inner rib including the lateral crosspieces 15a and the longitudinal crosspieces 15b, the growth toward the lower side of the entire positive electrode grid body 1 can be suppressed. As described in the background art, since the growth which has occurred downward turns upward by the bottom surface of the battery case or the saddle portion provided on the bottom surface, which supports the electrode plate group, the upper end of the positive plate may contact a part of the negative electrode such as a negative electrode strap to cause internal short circuit. According to the configuration (C1) of the second embodiment, the growth toward the upper side can be prevented by absorbing the growth toward the lower side by the inner rib including the lateral crosspieces 15a and the longitudinal crosspieces 15b, and an internal short circuit caused by the contact between the upper end of the positive plate and a part of the negative electrode such as the negative electrode strap can be suppressed.

In the example shown in FIG. 2 and FIG. 5, all of the plurality of longitudinal crosspieces 15b' defining the first opening portion group 17 are arranged shifted in a lateral direction X from the plurality of longitudinal crosspieces 15b defining the plurality of opening portions 16 adjacent to the first opening portion group 17 in the lateral direction Y, but the crosspieces are not limited to this example.

In addition, it is preferable that "at least parts of the plurality of longitudinal crosspieces 15b' defining the first opening portion group 17" includes the plurality of longitudinal crosspieces 15b' located directly under the positive electrode current collection lug 11A, and is 50% or more, preferably 70% or more of the plurality of longitudinal crosspieces 15b' arranged in the lateral direction X.

(D) Shape of Longitudinal Crosspieces 15b (D1) Configuration (D1) of the positive electrode grid body 1 according to the second embodiment will be explained with reference to FIG. 2. As represented in the part enclosed with symbol (D1) in the positive electrode grid body 1 of FIG. 2, at least parts of the plurality of longitudinal crosspieces 15b disposed directly under the positive electrode current collection lug 11A are formed such that the cross-sectional area is the largest at the portion connected to the first lateral frame rib 13a and that the cross-sectional area becomes larger from the second lateral frame rib 13b side (i.e., the lower side in FIG. 2) toward the first lateral frame rib 13a (i.e., the upper side in FIG. 2).

The positive electrode grid body 1 according to the second embodiment has configuration (D1) and comprises the longitudinal crosspieces 15b in which the connection with the first lateral frame rib 13a is reinforced. Therefore, in the vicinity of the positive electrode current collection lug 11A where the current density is large and the positive electrode grid body 1 is easily corroded, the longitudinal crosspieces 15b can prevent breakage caused by the corrosion and can improve the mechanical strength to suppress the deformation of the positive electrode grid body 1. As a result, peeling or dropping of the positive active material can be suppressed, and the accelerative growth of the positive electrode grid body 1 can also be suppressed. In addition, since the cross-sectional area of the plurality of longitudinal crosspieces 15b becomes relatively smaller on the lower side of the positive electrode grid body 1, where the positive electrode grid 1 is less affected by the expansion and contraction of the positive electrode active material, the weight reduction of the lead-acid battery is not impaired.

In addition, in the longitudinal crosspieces 15b disposed directly under the positive electrode current collection lug 11A where the current density is maximum, the potential distribution at charging and discharging of the entire positive electrode grid body 1 can be made uniform, by forming cross-sectional area larger to the upper side such that that of the portion connected to the first lateral frame rib 13a is maximum. As a result, it is possible to efficiently collect the power extracted from the positive electrode active material filled in the positive electrode grid body 1 by the charging/discharging reaction, and to improve the input/output characteristics of the lead-acid battery provided with the positive electrode grid body 1.

The plurality of longitudinal crosspieces 15b shown in FIG. 2 may be formed such that the cross-sectional area is the largest at the portion connected to the first lateral frame rib 13a and the cross-sectional area becomes larger from the second lateral frame rib 13b side toward the first lateral frame rib 13a, at all the longitudinal crosspieces 15b including the plurality of longitudinal crosspieces 15b located directly under the positive electrode current collection lug 11A surrounded by symbol (D1). According to such a configuration, the mechanical strength of the upper side of the positive electrode grid body 1 having a large current density and easily corroded is improved, and the potential distribution in the longitudinal direction Y in the positive electrode grid body 1 is further uniform. As a result, the growth toward the upper side of the positive electrode grid body 1 can be further suppressed, and the input/output characteristics of the lead-acid battery comprising the positive electrode grid body 1 can be further improved.

From the viewpoint of uniforming the potential distribution of the positive electrode grid body 1 more desirably, in at least parts of the plurality of longitudinal crosspieces 15b disposed directly under the positive electrode current collection lug 11A, it is preferable to set an average cross-sectional area to be the largest, in addition to the configuration that the cross-sectional area becomes larger toward the upper side.

"The cross-sectional area of the plurality of longitudinal crosspieces 15b becomes larger" means making the cross-sectional area of the plurality of longitudinal crosspieces 15b larger continuously and/or stepwise. That is, as in the example shown in FIG. 2, the longitudinal crosspieces 15b may be formed such that the cross-sectional area becomes larger with a constant taper angle continuously from the lower side to the upper end, or may be formed such that the cross-sectional area becomes larger in several stages such that a portion where the same cross-sectional area continues for a certain distance discontinuously from the lower side to the upper end.

In the example shown in FIG. 2, the plurality of longitudinal crosspieces 15b represented in the part surrounded by (D1) in the positive electrode grid body 1 have the same shape, but the longitudinal crosspieces are not limited to this. For example, the plurality of longitudinal crosspieces 15b may have different shapes each other. More specifically, the plurality of longitudinal crosspieces 15b may be different with respect to a length of a section where the cross-sectional area is formed to be large or the mode of changing of the cross-sectional area. That is, some of the plurality of lateral crosspieces 15a may be formed such that one of cross-sectional area becomes larger stepwise and the others of cross-sectional area become larger continuously. In addition, "the cross-sectional area of the longitudinal crosspieces s larger" is not limited to increasing the width of the longitudinal crosspieces 15 of the positive electrode grid body 1 in planar view as in the example shown in FIG. 2 but, for example, the thickness of the plurality of longitudinal crosspieces 15b may be increased.

(E) Shape of Opening Portions 16

Figure 6:
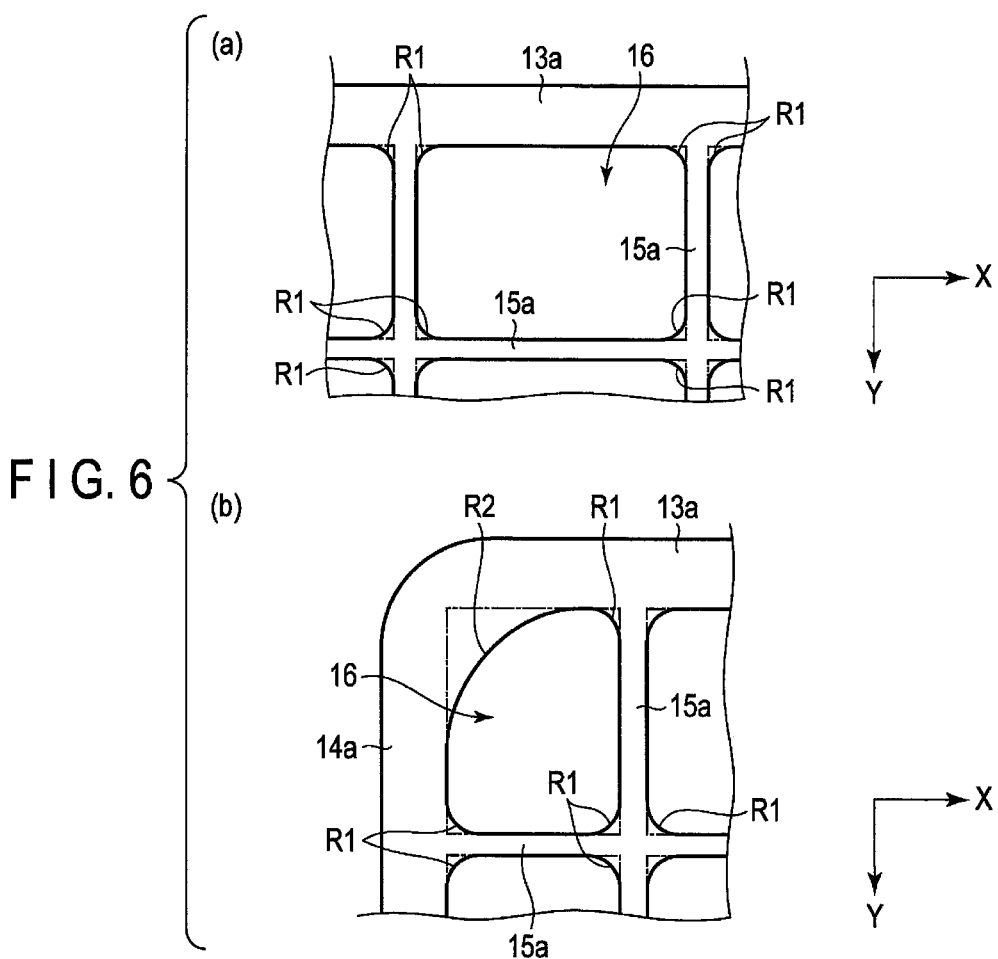
FIG. 6 is a partially enlarged plan view showing the positive electrode grid body shown in FIG. 2.

(E1) Configuration (E1) of the positive electrode grid body 1 according to the second embodiment will be explained with reference to FIG. 2 and FIG. 6. (a) of FIG. 6 is an enlarged plan view showing one opening portion 16 arranged adjacent to the first lateral frame rib 13a of the positive grating body 1 shown in FIG. 2. As shown to FIG. 2 and (a) of FIG. 6, rounds R1 are formed at four corners where the plurality of opening portions 16 formed in the positive electrode grid body 1 in planar view. The size of the rounds R1 can be defined by, for example, the radius of curvature of the rounds R1.

By forming the rounds R1 at four corners of the opening portion 16 in planar view, the filling property of the positive electrode active material into the opening portion 16 is improved, and a unfilled area is reduced. Therefore, the adhesion between the positive electrode grid body 1 and the positive electrode active material can be improved. Furthermore, since the mechanical strength at four corners of the opening portion 16 is improved, deformation of the positive electrode grid body 1 can be prevented, and an internal short circuit caused by the contact between the positive plate and a part of the negative electrode such as a negative plate or negative electrode strap, or peeling or falling of the positive electrode active material and the accompanying accelerative growth can be prevented.

Note that the rounds R1 formed at the plurality of opening portions 16 are not limited to the example shown in (a) of FIG. 6, but their arrangement or size may be appropriately selected according to the ease of peeling or dropping of the positive electrode active material. In addition, it has been described that the size of the round R1 may be defined by the radius of curvature, but the rounds are not limited to an arc. For example, the rounds may be polygons close to a circular arc. The size of the rounds R1 may be defined by, for example, the change rate of area by the rounds R1 as compared with a case where the opening portion 16 has a rectangular shape.

(E2) Configuration (E2) of the positive electrode grid body 1 according to the second embodiment will be explained with reference to FIG. 2 and FIG. 6. In the configuration (E2), among the plurality of opening portions 16 adjacent to the frame rib, larger rounds R are formed at four corners of the opening portions 16 located at least four corners of the frame rib in planar view, as compared with the opening portions 16 located at portions excepting four corners of the frame rib. At the opening portions located at four corners of the frame rib, the size of the round R of the corner closest to the corner of the frame rib in each of the opening portions is the largest.

(b) of FIG. 6 shows the opening portion 16 disposed at the corner of the upper left side defined by the first lateral frame rib 13a and the first longitudinal frame rib 14a in the positive electrode grid body 1. At the opening portion 16 disposed at the corner of the upper left side of the frame rib, the round of the upper left corner closest to the corner of the frame rib is referred to as R2 and the round of the other three corners in the opening portion 16 is referred to as R1. For example, the size of the round R1 and R2 is defined by the radius of curvature of the round R, and the round R2 becomes larger than the round R1.

In addition, the opening portions 16 disposed at the other three corners of the frame rib also have a large round R2 at the corner closest to the corner of the frame rib as in (b) of FIG. 6. Except for the opening portions 16 disposed at the four corners of the frame rib, a small round R1 is formed at the four corners of the opening portion 16 as in (a) of FIG. 6.

Since the positive electrode grid body 1 according to the second embodiment has the configuration (E2) in addition to the configuration (E1), the filling property of the positive electrode active material into the opening portion 16 of the positive electrode grid body 1 is improved, and a unfilled area is reduced, and therefore the adhesion between the positive electrode grid body 1 and the positive electrode active material can be improved. Furthermore, since the mechanical strength at four corners in the opening portion 16 is improved, deformation of the positive electrode grid body 1 can be prevented, and an internal short circuit caused by the contact between the positive plate and a part of the negative electrode such as the negative plate or negative electrode strap, or peeling or falling of the positive electrode active material and the accompanying accelerative growth can be prevented. In addition, in the positive electrode grid body 1, among the plurality of opening portions 16, a large round R2 is selectively formed at four corners in the opening portions 16 disposed at the four corners of the frame rib in which the positive electrode active material is easily peeled or dropped. For this reason, peeling or dropping of the positive electrode active material from the positive electrode grid body 1 and the growth of the positive electrode grid body 1 can be prevented more effectively without causing an unnecessary increase in weight of the positive electrode grid body 1.

Note that the rounds R1 and R2 formed at the plurality of opening portions 16 are not limited to the example shown in (a) and (b) of FIG. 6, but their arrangement and size may be arbitrarily selected in accordance with the ease of peeling or dropping of the positive electrode active material. Also, two or more types of rounds R may be formed at four corners in the opening portion 16. For example, the rounds R at one corner and the remaining three corners may be made different from each other among four corners in the opening portion 16, the rounds R at two corners and the remaining two corners may be made different from each other among four corners in the opening portion 16, the rounds R at all corners may be made different from each other among four corners in the opening portion 16, or the rounds R at two or three corners may be made different from each other and the rounds R may not be formed at remaining one or two corners among four corners in the opening portion 16. The opening portion 16 having no rounds R at all four corners may be arranged at a part of the inner rib. It has been described that the size of the round R1 or R2 may be defined by the radius of curvature, but the round R1 or R2 is not limited to an arc. For example, the rounds may be polygons close to a circular arc. Furthermore, the size of the round R1 or R2 may be defined by, for example, how the area is reduced by the round R1 or R2 as compared with a case where the opening portion 16 has a rectangular shape.

Figure 7:
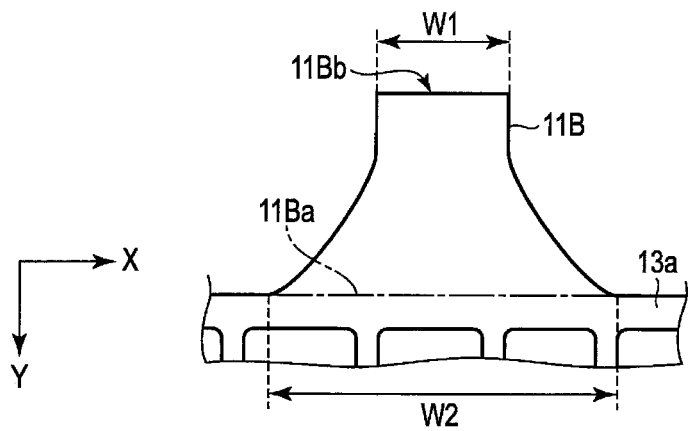
FIG. 7 is a partially enlarged plan view showing the positive electrode grid body shown in FIG. 2.

(F) Shape of Positive Collection Lug 11A (F1) Configuration (F1) of the positive electrode grid body 1 according to the second embodiment will be explained with reference to FIG. 2 and FIG. 7. FIG. 7 is an enlarged view of the part surrounded with symbol (F1) in the positive electrode grid body 1 in FIG. 2. The positive electrode current collection lug 11A is formed such that its width becomes larger stepwise from the end 11Bb opposite to a connection end 11Ba with the first lateral frame rib 13a toward the connection end 11Ba. In the example shown in FIG. 7, for example, the positive electrode current collection lug 11A has width W1 at the opposite end 11Bb. Further, the positive electrode current collection lug 11A has a constant width portion with a width W1 from the opposite end 11Bb to the lower side. Furthermore, the positive electrode current collection lug 11A has a portion where the width increases continuously from the constant width portion with the width W1 toward the connection end 11Ba of the lower end, and has width W2 at the connection end 11Ba. The width W2 is not particularly limited as long as it is larger than the width W1 but, for example, in the example shown in FIG. 7, the width W2 is approximately 2.5 times as the width of W1.

Since the positive electrode grid body 1 according to the second embodiment comprises the configuration (F1), the potential distribution during charging and discharging of the entire positive electrode grid body 1 can be made uniform. For this reason, also on the lower side of the positive electrode grid body 1 which is a position far from the positive electrode current collection lug 11A, the electric power extracted from the positive electrode active material by the charging/discharging reaction can be efficiently collected, and the input/output characteristics of the lead-acid battery comprising the positive electrode grid body 1 can be improved.

In addition, in the configuration (F1), by setting the width of the positive electrode current collection lug 11A to become larger stepwise from the end 11Bb on the side opposite to the connection end 11Ba with the first lateral frame rib 13a toward the connection end 11Ba, the mechanical strength of the first lateral frame rib 13a can be improved around the connection end 11Ba, and the growth toward the upper side of the positive electrode grid body 1 can be suppressed. As a result, the upward deformation of the positive electrode grid body 1 can be prevented, and an internal short circuit between the positive plate and the negative plate, which is accompanied by upward growth, can be suppressed.

Further, in the example shown in FIG. 2, the positive electrode current collection lug 11A is configured of a portion having a constant width and a portion having a continuously increasing width from the upper side to the connection end 11Ba at the lower end. According to this configuration, the above-described suppression of the internal short circuit can be achieved and, at the same time, a lead-acid battery can be manufactured at low costs using general-purpose manufacturing equipment, by forming a constant width portion of the positive electrode current collection lug 11A to be in a rectangular plate shape.

(G) Elements added to Lead Alloy (G1) The positive electrode grid body 1 is formed of a lead alloy of a composition containing 0.02 to 0.08 mass % of Ca, 0.4 to 2.5 mass % of Sn, 0.005 to 0.04 mass % of Al, 0.001 to 0.0049 mass % of Ag, the balance being Pb and unavoidable impurities.

Thus, since the component elements of Ca, Sn, Al, and Ag are added in a specific range to the lead alloy constituting the positive electrode grid body, both the corrosion resistance and the mechanical strength of the resulting lead alloy can be improved. The addition of Ca improves the mechanical strength of the positive electrode grid body. If the addition amount of Ca is less than 0.02 mass %, the effect may be small, and if it exceeds 0.08 mass %, the corrosion resistance may be reduced. The addition of Sn improves the flow-ability of the molten lead alloy and improves the mechanical strength of the positive electrode grid body. If the addition amount of Sn is less than 0.4 mass %, the effect may be small, and if it exceeds 2.5 mass %, the corrosion resistance may be reduced. The addition of Al prevents the loss of Ca caused by the oxidation of the molten metal and further improves the mechanical strength of the positive electrode grid body. If the addition amount of Al is less than 0.005 mass %, the effect may be small, and if it exceeds 0.04 mass %, Al is likely to precipitate as dross. The addition of Ag improves the mechanical strength and, in particular, enhances the creep resistance properties at a high temperature. If the addition amount of Ag is less than 0.001 mass %, the effect is small, and if it exceeds 0.0049 mass %, the effect can not be expected to increase with the increase of the addition amount.

Next, effects of the positive electrode grid body 1 according to the second embodiment will be described.

Since the positive electrode grid body 1 according to the second embodiment comprises the above-described configurations (A1) to (A3), (B1) to (B3), (C1), (D1), (E1), (E2), (F1), and (G1) as shown in FIG. 2, the advantages described in the respective configurations can be obtained. In summary, the following advantages (1) to (5) can be mainly obtained from the positive electrode grid body 1 according to the second embodiment.

(1) Improvement in mechanical strength of positive electrode grid body; since the positive electrode grid body according to the second embodiment is formed such that the area of the opening portion in planar view becomes smaller toward the upper, right, and left ends of the positive electrode grid body, the number of lateral crosspieces and longitudinal crosspieces in the positive electrode grid body becomes relatively larger, and the mechanical strength becomes higher. As a result, the deformation of the positive electrode grid body in the lateral direction X and the longitudinal direction Y can be prevented. Furthermore, in the first region and the second region, since the plurality of lateral crosspieces are formed such that the cross-sectional area thereof becomes larger from the center side of the positive electrode grid body toward the portion connected to the outer longitudinal frame rib, the mechanical strength in the lateral direction X is increased and the growth can be suppressed. In addition, since at least parts of the plurality of longitudinal crosspieces disposed directly under the positive electrode current collection lug are formed such that the cross-sectional area becomes larger from the lower side to the upper side, the mechanical strength on the upper side of the positive electrode grid body where the current density is large and which is easily corroded can be improved, the mechanical strength in the longitudinal direction Y in the positive electrode grid body can be increased, and the growth can be suppressed. In addition, the growth in the longitudinal direction Y can be absorbed by the deformation of the inner rib in the first opening group. Moreover, since the positive electrode current collection lug is formed such that the width becomes larger stepwise toward the connection end connecting with the first lateral frame, the mechanical strength of the first lateral frame is improved, and the upward bending accompanying the deformation of the positive electrode grid body caused by charging and discharging can be suppressed effectively.

Therefore, since the positive electrode grid body according to the second embodiment comprises a plurality of configurations for suppressing its deformation, an internal short circuit caused by the contact between the positive plate and a part of the negative electrode such as the negative plate or the negative electrode strap as accompanied by the upward growth on both right and left sides of the positive electrode grid body can be prevented more remarkably, and the longer life of the lead-acid battery can be realized, even if corrosion caused by repetition of charging/discharging and the expansion, contraction, etc., of the active material occur.

(2) Improvement of the adhesion between the positive electrode grid body and the positive electrode active material; since the positive electrode grid body according to the second embodiment is formed such that the area of the opening portion in planar view becomes smaller toward the upper, right, and left ends of the positive electrode grid body, the contact area of the inner rib including the lateral crosspieces and the longitudinal crosspieces to the positive electrode active material filled into the positive electrode grid body is increased and, especially, the adhesion between the positive electrode grid body and the positive electrode active material becomes preferable in the vicinity the upper, right, and left ends. As a result, peeling or dropping of the positive electrode active material from the positive electrode grid body can be suppressed when the positive electrode active material expands or contracts with charging and discharging, and the electrolytic solution can be prevented from contacting the surface of the positive electrode grid body where the positive electrode active material is peeled or dropped, and the accelerative growth of the positive electrode grid body can be suppressed. Therefore, the internal short circuit of the lead-acid battery can be prevented, and the long life of the lead-acid battery can be realized.

(3) Prevention of the increase in weight of the positive electrode grid body; the positive electrode grid body according to the second embodiment comprises a configuration that increase in the number of lateral crosspieces and longitudinal crosspieces in the positive electrode grid body or stepwise increase in cross-sectional area, and stepwise increase in cross-sectional area of the current collection lug, and reinforcement of four corners in the opening portion by forming rounds R are selectively applied to the portion where the influence of growth is large, and peeling or falling of the positive electrode active material and deformation of the positive electrode grid body easily occur. For this reason, both the weight reduction and long life of the positive electrode grid body can be achieved.

(4) In the positive electrode grid body according to the second embodiment, the potential distribution during charging and discharging can be preferably uniformed by specifying the shapes of the plurality of longitudinal crosspieces and the positive electrode current collection lug of the positive electrode grid body. As a result, the power extracted from the positive electrode active material by the charging/discharging reaction can be collected efficiently, on the lower side of the positive electrode grid body remote from the positive electrode collection lug, too, and the input/output characteristics during charging and discharging of the lead-acid battery provided with the positive electrode grid body can be improved.

(5) Prevention of corrosion of positive electrode grid body; since a predetermined amount of Ca, Sn, Al or Ag is added to a lead alloy constituting the positive electrode grid body, the mechanical strength and the corrosion resistance of the positive electrode grid body can be improved.

Although not shown, the opening portion located directly under the negative collection lug or electrode strap connected to the negative collection lug which is provided on the negative plate of the lead-acid battery, of the plurality of opening portions in the first row from the upper side adjacent to the first lateral frame rib or the plurality of opening portions in the second row adjacent to the plurality of opening portions in the first row, may be divided by an auxiliary crosspiece. According to such a configuration, the mechanical strength of the positive electrode grid body arranged at the position corresponding to the negative electrode collection lug, etc., can be improved, and the upward growth of the positive electrode grid body which causes the internal short circuit between the positive plate and the negative plate can be suppressed more significantly.

Third Embodiment

A positive electrode grid body according to the third embodiment does not need to comprise all of the configurations described in the second embodiment, but comprises one or more configurations selected from (A1) to (A3), (B1) to (B3), (C1), (D1), (E1), (E2), (F1), and (G1) in addition to the configuration (A1). According to such configurations, it is possible to obtain synergistic effects combining the effects described in the items of each configuration to be selected. Here, the positive electrode grid body 1 also comprises the configuration (B1) when comprising the configuration (B2), and also comprises the configuration (E1) when comprising the configuration (E2). In particular, the positive electrode grid body comprising a combination of the configurations (C1) and (D1) is more desirable with respect to prevention of the deformation caused by the growth. In addition, the positive electrode grid body comprising a combination of the configurations (D1) and (F1) is more desirable with respect to the uniformity of the potential distribution during charging and discharging and the improvement of the output characteristics when incorporated in the lead-acid battery. In addition, the positive electrode grid body comprising a combination of the configuration (G1) with each of the above configurations is more desirable with respect to prevention of the deformation caused by the growth since the mechanical strength and the corrosion resistance is improved.

Fourth Embodiment

Figure 8:
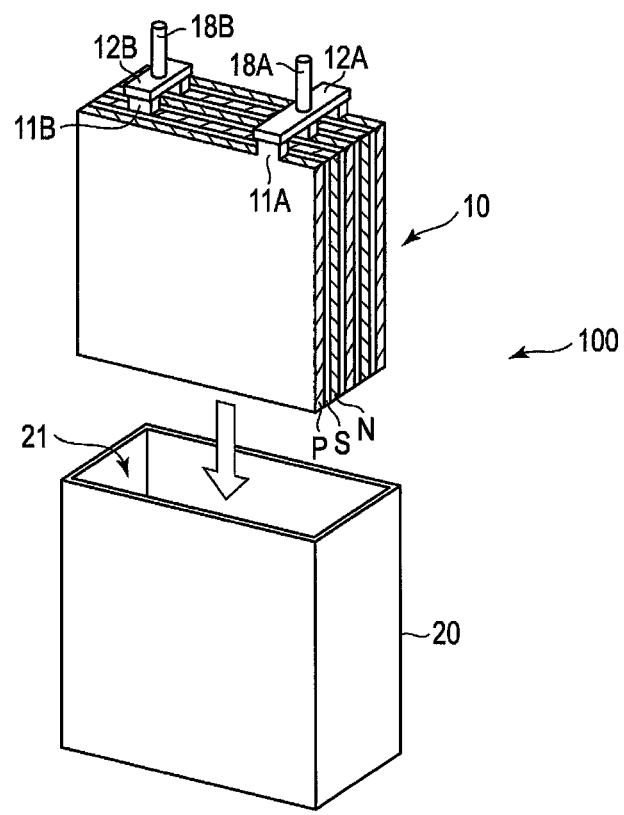
FIG. 8 is a perspective view showing a lead-acid battery according to a fourth embodiment.

FIG. 8 is a perspective view showing a lead-acid battery 100 according to a fourth embodiment. The lead-acid battery 100 according to the fourth embodiment comprises the positive electrode grid body 1 according to the first to third embodiments. The configuration of the lead-acid battery 100 according to the fourth embodiment is not particularly limited except that the positive electrode grid body 1 according to the first to third embodiments is used in the positive plate. As shown in FIG. 8, the lead-acid battery 100 is a lead-acid battery of a single cell with an electromotive force of 2V, and is composed of a positive plate P, a negative plate N, diluted sulfuric acid as an electrolyte, a separator S (retainer mat formed of glass fiber, etc.), an battery case 20, a lid (not shown), and the like. For example, while interposing the separator S between the positive plate P and the negative plate N, the positive plate P and the negative plate N are alternately laminated one by one, positive electrode collection lugs 11A are connected to each other by a positive electrode strap 12A and negative electrode collection lugs 11B are connected to each other by a negative electrode strap 12B respectively, to form an electrode plate group 10. A positive electrode pole 18A and a negative electrode pole 18B extending upward are connected to the positive electrode strap 12A and the negative electrode strap 12B, respectively. The electrode plate group 10 is put into the battery case 20 through an opening portion 21 of the battery case, a lid is fitted thereto, and the positive electrode pole 18A and the negative electrode pole 18B are inserted and welded to a hollow positive electrode terminal (not shown) and a hollow negative electrode terminal (not shown) provided on the lid, respectively. After pouring dilute sulfuric acid which is an electrolytic solution from a pouring port provided on the lid, chemical conversion is performed to complete the lead-acid battery 100 with an electromotive force of 2V.

As described above in detail, according to the positive electrode grid body 1 and the lead-acid battery 100 according to the first to fourth embodiments, the internal short circuit caused by the contact with the positive plate P and a part of the negative electrode such as the negative plate N or the negative electrode strap 12B caused by the deformation of the positive electrode grid body 1 can be prevented, and the durability of the lead-acid battery 100 can be improved to realize longer life.

In each of the embodiments, the example that the lateral frame rib of the positive electrode grid body 1 and the plurality of lateral crosspieces 15a are disposed in parallel, and the lateral frame rib and the plurality of lateral crosspieces 15a are arranged at right angles to the longitudinal frame rib and the plurality of longitudinal crosspieces 15b has been described, but they are not limited to this. For example, the lateral frame ribs 13a and 13b and the plurality of lateral crosspieces 15a may not be arranged in parallel to each other, and may be arranged at a desired angle to each other. Similarly, the longitudinal frame ribs 14a and 14b and the plurality of longitudinal crosspieces 15b may not be arranged in parallel to each other, and may be arranged at a desired angle to each other. In addition, the example that the lateral frame ribs 13a and 13b and the longitudinal frame ribs 14a and 14b constituting the frame rib, and the plurality of lateral crosspieces 15a and the longitudinal crosspieces 15b constituting the inner rib have a mainly linear shape has been described, but they are not limited to this, and may be curved or branched.

In each of the embodiments, the example that the shape of the plurality of opening portions 16 is a rectangular shape or a rectangular shape having the rounds R at four corners has been described, but the shape is not limited to this. The shape of the plurality of opening portions 16 may be, for example, another polygonal shape or a circular shape.

In addition, in each of the embodiments, as described above, as a method of reducing the area of the opening portion 16 of the positive electrode grid body 1, narrowing the intervals of arrangement of the plurality of lateral crosspieces 15*a* and longitudinal crosspieces 15*b* which constitute the frame rib and inner rib defining the opening portion 16 has been described, but the present invention are not limited thereto. In order to reduce the area of the opening portion 16, for example, the rounds R may be provided at four corners of the rectangular opening portion 16. By appropriately changing the curvature radius of the rounds R, the area of the opening portion 16 can be adjusted. Alternatively, in order to reduce the area of the opening portion 16, the size of the frame rib and the plurality of crosspieces defining the opening portion 16 may be increased. In addition, the methods for reducing the area of the opening portion 16 described above may be combined as appropriate.

Furthermore, as described above, it has been described that the positive electrode current collection lug 11A is formed such that its width is increased stepwise from the upper side to the lower side, but the shape may be appropriately changed in consideration of current collection performance and strength and may be, for example, a fan shape, a triangle shape, or a rectangular shape with rounded corners. In addition, the width of the positive electrode current collection lug 11A may be changed as appropriate.

The configurations disclosed in the first to fourth embodiments described above can be combined as appropriate. In addition, the positional relationship between right and left sides is based on the position of the positive electrode current collection lug 11A, in the positive electrode grid body 1 in which the positive electrode current collecting lug 11A is unevenly provided on the opposite side to the positive electrode grid body 1 of the present invention, the reinforcement described above should just reverse the positional relationship between right and left sides. The embodiments of the positive electrode grid body 1 for lead-acid battery and the lead-acid battery 100 including the same have been specifically described above, but the present invention is not limited to these embodiments, and variously modified based on the technical idea of the present invention are possible.

EXAMPLES

The positive electrode grid body for lead-acid battery and the lead-acid battery of the present invention will be specifically described by examples and comparative examples.

<Example of Production of Positive Electrode Grid Body A>

After the first lateral frame rib formed the positive electrode current collection lug and the second lateral frame rib were arranged in parallel, the first and second lateral frame ribs were connected to the first and second longitudinal frame ribs so as to make right angles, and a rectangular frame rib was thereby formed. In the rectangular space surrounded by the frame rib, fifteen lateral crosspieces having both ends horizontally connected to the first and second longitudinal frame ribs, and twelve longitudinal crosspieces having both ends vertically connected to the first and second lateral frame ribs were arranged as the inner rib, and thereby a positive electrode grid body A having a height of 113.0 mm and a width of 105.0 mm was obtained.

Each of the plurality of lateral crosspieces had a constant cross-sectional area at the central portion and, had a tapered shape in which the cross-sectional area became larger from the central side to the portion connected to the first longitudinal frame rib on the left side, in the first region. Here, the first region was defined by a 20-mm section of the longitudinal crosspieces from the connection with the first lateral frame rib to the second lateral frame, and a 45-mm section of the lateral crosspieces from the connection with the first longitudinal frame rib to the second longitudinal frame rib. In particular, in the positive electrode grid body A, in the section from the second longitudinal frame rib side (right side) to the portion connected with the first longitudinal frame rib, the first and second lateral crosspieces counted from the first lateral frame rib side were formed such that the cross-sectional area increased from 0.60 $mm^2$ to 1.60 $mm^2$ over 45-mm and 35-mm sections, respectively, and the third lateral crosspiece was formed such that the cross-sectional area increased from 0.60 $mm^2$ to 1.20 $mm^2$ over a 25-mm section.

Such a positive electrode grid body A was produced by using a Pb—Ca—Sn—Al—Ag-based lead alloy consisting of 0.06 mass % of Ca, 1.6 mass % of Sn, 0.02 mass % of Al, 0.002 mass % of Ag, and the balance of Pb as a raw material of a slab, forming a rolled sheet having a thickness of 0.8 mm through a slab casting process and a rolling process, and then press-punching the rolled sheet by the punching press machine.

<Example of Production of Positive Electrode Grid Body B>

A positive electrode grid body B similar to the positive electrode grid body A was produced except for comprising the configuration described below.

The cross-sectional area of the central portion was constant in each of fifteen lateral crosspieces constituting the inner rib of the positive electrode grid body B. In addition, in the section located below the first reason described in the production example of the positive electrode grid body A, the fourth to ninth lateral crosspieces counted from the first lateral frame rib side were formed such that the cross-sectional area increased from 0.55 $mm^2$ to 1.00 $mm^2$ over a 20-mm section from the second longitudinal frame rib side (right side) to the portion connected with the first longitudinal frame rib, and tenth to fifteenth lateral crosspieces were formed such that the cross-sectional area increased from 0.45 $mm^2$ to 0.80 $mm^2$ over a 20-mm section.

<Example of Production of Positive Electrode Grid Body C>

A positive electrode grid body C similar to the positive electrode grid body B was produced except for comprising the configuration described below.

That is, the cross-sectional area of the central portion was constant in each of fifteen lateral crosspieces constituting the inner rib of the positive electrode grid body C, and the shape from the center portion toward the first lateral frame rib was also the same as in the positive electrode grid body B. In addition, in a region defined by a section of the length of the inner rib along the second longitudinal frame rib and a 15-mm section of the length in the lateral direction X of the lateral crosspiece from the second longitudinal frame rib, all the lateral crosspieces were formed such that the cross-sectional area increased by 50% from the first longitudinal frame rib side toward the portion connected with the second longitudinal frame rib.

<Example of Production of Positive Electrode Grid Body D>

A positive electrode grid body D similar to the positive electrode grid body A was produced except for comprising the configuration described below.

When the positive electrode grid body D was seen in planar view, the average area of the plurality of opening portions adjacent to the first longitudinal frame rib and the second longitudinal frame rib was 28 mm², and the average area of the opening portions excepting the above plurality of opening portions was 45 mm². In addition, in all the opening portions, as compared on the same perpendicular line crossing each of the first and second longitudinal frame ribs at right angles, the area was reduced stepwise in the range of 0.85 times to 0.99 times from the second lateral frame rib side toward the first lateral frame rib side, and the area was reduced stepwise in the range of 0.70 times to 0.98 times from the center side of the positive electrode grid body toward both right and left sides.

<Example of Production of Positive Electrode Grid Body E>

A positive electrode grid body E similar to the positive electrode grid body A was produced except for comprising the configuration described below.

In thirteen longitudinal crosspieces defining the first opening portion group adjacent to the second lateral frame rib of the positive electrode grid body E, the thirteen longitudinal crosspieces were arranged shifted in the lateral direction X so as to be discontinuous with twelve lateral crosspieces connected to the first lateral frame rib of the positive electrode grid body E.

<Example of Production of Positive Electrode Grid Body F>

A positive electrode grid body F similar to the positive electrode grid body A was produced except for comprising the configuration described below.

Among twelve longitudinal crosspieces constituting the inner rib of the positive electrode grid body F, in two longitudinal crosspieces located directly below the positive electrode current collection lug, the cross-sectional area was set at 1.206 mm² at the portion connected to the first lateral frame rib side, and the cross-sectional area became larger from the cross-sectional area of 1.00 mm² on the second lateral frame rib side (lower side) toward the first lateral frame rib side (upper side). In the other ten longitudinal crosspieces, the cross-sectional area was set at 1.00 mm² at the portion connected to the first lateral frame rib side, and the cross-sectional area increased from the cross-sectional area of 0.90 mm² on the lower side toward the upper side.

<Example of Production of Positive Electrode Grid Body G>

A positive electrode grid body G similar to the positive electrode grid body A was produced except for comprising the configuration described below.

That is, each of fourteen lateral crosspieces included no tapered portion in each of the sections, and had a constant cross-sectional area (0.56 mm²).

Example 1

A lead-acid battery was manufactured in the following method using the positive electrode grid body A produced by the above-described method.

First, a positive electrode active material paste prepared in a conventional method was filled into the positive electrode grid body A having a height of 113.0 mm and a width of 105.0 mm to manufacture a positive electrode-filled plate. In addition, a negative grid body was prepared by continuous casting of a lead alloy mainly containing lead and containing Ca and Sn, which had the same height, a width and a thickness of 0.8 mm as the positive electrode grid body and had a radial shape in which a current collection lug are symmetrical with the positive electrode grid body, and a negative electrode active material paste prepared in a conventional method was filled into the negative grid body to manufacture a negative electrode-filled plate. Subsequently, the positive electrode-filled plate and the negative electrode-filled plate were matured and dried in a conventional method to obtain an unformed positive electrode-matured plate and a negative electrode-matured plate, respectively.

Next, the negative electrode matured plate was accommodated in a bag-shaped separator formed of polyethylene resin, and the negative electrode current collection lug of the negative electrode matured plate was drawn from the opening portion of the bag-shaped separator. Subsequently, seven positive electrode matured plates and eight negative electrode matured plates accommodated in the bag-shaped separator were alternately laminated via a retainer mat obtained by forming glass fibers. The current collection lugs of the positive electrode matured plates, and the current collection lugs of the negative electrode matured plates were connected by strap welding, respectively, and a positive electrode strap and a negative electrode strap were formed to obtain electrode plate groups. The positive electrode strap and the negative electrode strap were provided with inter-cell connectors or pole terminals.

Subsequently, the electrode plate groups were accommodated in the plurality of cell chambers provided in the 12V-type battery case, respectively. The electrode plate groups adjacent to each other were connected electrically in series by resistance welding of the inter-cell connectors provided on the respective straps. Subsequently, after a lid was fitted to the opening portion of the battery case, in a state the pole terminals penetrate through the bushing of the lid, these were welded by heat sealing. Then, a predetermined amount of a dilute sulfuric acid electrolyte solution having a specific gravity adjusted to 1.240 was injected into the battery case through a liquid injection port opened at the lid, a liquid injection plug and an exhaust plug were screwed to seal the inside of the battery case, and then forming was performed based on a predetermined current value, a predetermined temperature, and a predetermined time. After completion of forming, the electrolytic solution was replenished, and M-42 type lead-acid battery with a 5-hour rate capacity of a 32-Ah was manufactured.

Examples 2 to 6 and Comparative Example 1

A lead-acid battery was manufactured in the same method as in Example 1 using the positive electrode grid body B, C, D, E, F, and G produced in the above-described method.

<Evaluation Tests>

The obtained lead-acid batteries of Examples 1 to 6 and Comparative Example 1 were subjected to a high-temperature overcharge life test according to the following procedure, growth rate $R_Y$ in the longitudinal direction Y and growth rate $R_X$ in the lateral direction X, and the number of life cycles of the positive electrode grid body were measured, and the growth rate $R_X$ in the lateral direction X and the number of life cycles were evaluated. The evaluation results are shown below in Table 1.

TABLE 1

| | Growth rate $R_X$ [%] | Number of life cycles |
|---|---|---|
| Example 1 | 5.80 | 115 |
| Example 2 | 5.50 | 130 |
| Example 3 | 5.20 | 140 |
| Example 4 | 5.60 | 125 |
| Example 5 | 5.70 | 120 |
| Example 6 | 5.75 | 118 |
| Comparative Example 1 | 9.70 | 100 |

In this test, the step of discharging the lead-acid battery at a discharge current of 25 A for two minutes in an environment of 75° C. and then charging at charging voltage of 14.8V and maximum charging current of 25 A for ten minutes were repeated. Furthermore, every time the step were repeated for 480 cycles, height position Y2 of the first lateral frame rib of the positive electrode grid body was measured by measuring the distance from the top surface of the lid to the first lateral frame rib of the positive electrode grid body. The difference between the height position Y2 and height position Y1 of the first lateral frame rib of the positive electrode grid body before the test is calculated, and growth rate RY [%] in the longitudinal direction Y was calculated based on the height of 113.0 mm excluding the positive electrode current collection lug of the positive electrode grid body before the test and the following formula (1). When the growth rate RY became 5.3% or more, it was judged that there was a possibility of causing an internal short circuit by coming into contact with the negative plate, and that the life ended.

[Formula 1]

$$R_Y = \frac{Y_2 - Y_1}{113} \times 100 \quad (1)$$

The battery judged to end the life was disassembled, maximum width X2 in the lateral direction X of the positive electrode grid body was measured with a ruler, and the growth rate $R_X$ [%] in the lateral direction X was calculated based on the width 105.0 mm of the positive electrode grid body before the test and the following formula (2).

[Formula 2]

$$R_X = \frac{Y_2 - 105}{105} \times 100 \quad (2)$$

The number of life cycles of Examples 1 to 6 in Table 1 represents a relative number of cycles in a case where the number of life cycles of Comparative Example 1 is 100.

As is apparent from Table 1, it can be understood that the lead-acid batteries of Examples 1 to 6 in which positive electrode grid bodies A to F are incorporated respectively, the growth rates $R_X$ in the lateral direction X were suppressed to 60%, 56%, 53%, 57%, 58%, and 59% respectively, and the number of life cycles were improved by 15%, 30%, 40%, 25%, and 18% respectively, as compared with the lead-acid battery of Comparative Example 1 in which positive electrode grid body G incorporated.

In addition, as a result of observing the presence or absence of peeling of the positive electrode active material from the positive electrode grid body after the measurement of each of the lead-acid batteries, almost no peeling was observed in the lead-acid batteries of Examples 1 to 6, but peeling was significant in the lead-acid battery of Comparative Example 1.

From the results shown in Table 1, it is presumed that in the positive electrode grid body A incorporated in the lead-acid battery of Example 1, by setting the cross-sectional area of the plurality of lateral crosspieces extending inward from the first longitudinal frame rib to be larger toward the outside, the growth in the lateral direction X is suppressed, and the plurality of opening portions defined by the first longitudinal frame rib are prevented from being expanded, and thereby peeling of the positive electrode active material from the positive electrode grid body is prevented. At the same time, it is presumed that, the corrosion of the positive electrode grid body caused by the entry of the electrolytic solution into the peeling portion and the accelerative growth of the positive electrode grid body accompanied by the corrosion were suppressed, and the deformation of the entire positive electrode grid body, and the internal short circuit caused by contact between the positive plate and a part of the negative electrode such as the negative plate or negative electrode strap were prevented, and the cycle life was improved.

It is presumed that, in the positive electrode grid body B incorporated in the lead-acid battery of Example 2, the cycle life was improved by further reinforcing the lateral crosspieces at the positions lower than the first region.

It is presumed that, in the positive electrode grid body C incorporated in the lead-acid battery of Example 3, the cycle life was improved by further reinforcing the plurality of lateral crosspieces in the second region.

It is considered that, in the positive electrode grid body D incorporated in the lead-acid battery of Example 4, peeling or dropping of the active material was suppressed and the cycle life was improved by forming the area of the opening portion to be small at the portion where the peeling or dropping of the positive electrode active material was likely to occur.

On the other hand, it is presumed that, in the positive electrode grid body E incorporated in the lead-acid battery of Example 5, since the portion where the longitudinal crosspieces were connected in a reverse T shape was provided at the lowermost opening portion, the downward growth could be absorbed by the inner rib, the internal short circuit was prevented and the cycle life was improved.

It is considered that, in the positive electrode grid body F incorporated in the lead-acid battery of Example 6, since all the longitudinal crosspieces were formed in a tapered shape in which the cross-sectional area of the portion connected to the first lateral frame rib was the largest, the growth in the longitudinal direction Y was suppressed, peeling or dropping of the active material was suppressed, and the cycle life was improved.

On the other hand, the positive electrode grid body G incorporated in the lead-acid battery of Comparative Example 1 was significantly deformed by growth, and peeling of the positive electrode active material occurred significantly. It is presumed that in the positive electrode grid body G, corrosion caused by the contact with the electrolytic solution and the accelerative growth occurred at the peeling portion, and the life ended early.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A positive electrode grid body for a lead-acid battery, comprising:
   a frame rib shaped in a rectangular frame comprising, when the positive electrode grid body having a positive electrode current collection lug arranged at an upper end of the positive electrode grid body is viewed in planar view, a first lateral frame rib located on the upper end and extending in a lateral direction, a second lateral frame rib located on a lower end and extending in the lateral direction, a first longitudinal frame rib located on a left end and extending in a longitudinal direction, and a second longitudinal frame rib located on a right end and extending in the longitudinal direction;

an inner rib disposed in the frame rib and comprising a plurality of lateral crosspieces which are extended in the lateral direction and are connected to the first and second longitudinal frame ribs, respectively, and a plurality of longitudinal crosspieces which are extended in the longitudinal direction and are connected to the first and second lateral frame ribs, respectively, the lateral crosspieces and the longitudinal crosspieces forming a grid; and a plurality of opening portions defined by a region surrounded by the frame rib and the plurality of lateral crosspieces and longitudinal crosspieces, and a region surrounded by the plurality of lateral crosspieces and longitudinal crosspieces, wherein the positive electrode current collection lug is connected to the first lateral frame rib which is located near the second longitudinal frame rib, in a region having a length of at least one opening portion or more in the lateral direction of the lateral crosspieces from the first longitudinal frame rib, a cross-sectional area of the plurality of lateral crosspieces located on at least a first lateral frame rib side becomes larger from a second longitudinal frame rib side toward the first longitudinal frame rib, an average area of the plurality of opening portions adjacent to the first longitudinal frame rib and the plurality of opening portions adjacent to the second longitudinal frame rib in planar view is smaller than an average area of a remaining plurality of opening portions excluding the plurality of opening portions, and in planar view, an area of the plurality of the opening portions adjacent to the first longitudinal frame rib becomes smaller stepwise from the second lateral frame rib toward the first lateral frame rib side, and in planar view, an area of the plurality of the opening portions adjacent to the second longitudinal frame rib becomes smaller stepwise from the second lateral frame rib toward the first lateral frame rib.

2. The positive electrode grid body for the lead-acid battery of claim 1, wherein in a region defined by a section of the length of the inner rib along the first longitudinal frame rib and a section of 20% to 45% of the length of the lateral crosspieces from the first longitudinal frame rib, a cross-sectional area of the plurality of lateral crosspieces becomes larger from the second longitudinal frame rib side toward the first longitudinal frame rib.

3. The positive electrode grid body for the lead-acid battery of claim 1, wherein in a first region defined by a section of 17% to 25% of the length in the longitudinal direction of the first longitudinal frame rib from the first lateral frame rib toward a second lateral frame rib side, and a section of 20% to 45% of the length in the lateral direction of the lateral crosspieces from the first longitudinal frame rib, a cross-sectional area of the plurality of lateral crosspieces becomes larger from the second longitudinal frame rib side toward the first longitudinal frame rib.

4. The positive electrode grid body for the lead-acid battery of claim 3, wherein among the plurality of lateral crosspieces located in the first region, a cross-sectional area of a portion connected to the first longitudinal frame rib becomes larger as the lateral crosspieces closer to the first lateral frame rib, a section of variation of the cross-sectional area becomes longer as the lateral crosspieces closer to the first lateral frame rib, and the section of variation becomes shorter stepwise from the first lateral frame rib toward the second lateral frame rib side.

5. The positive electrode grid body for the lead-acid battery of claim 1, wherein in a region defined by a section of the length of the inner rib along the second longitudinal frame rib and a section of 10% to 30% of the length in the lateral direction of the lateral crosspieces from the second longitudinal frame rib, a cross-sectional area of the plurality of lateral crosspieces becomes larger from a first longitudinal frame rib side toward the second longitudinal frame rib.

6. The positive electrode grid body for the lead-acid battery of claim 1, wherein in a second region defined by a section of 17% to 25% of the length in the longitudinal direction of the second longitudinal frame rib from the first lateral frame rib toward a second lateral frame rib side, and a section of 10% to 30% of the length in the lateral direction of the lateral crosspieces from the second longitudinal frame rib, a cross-sectional area of the plurality of lateral crosspieces becomes larger from a first longitudinal frame rib side toward the second longitudinal frame rib.

7. The positive electrode grid body for the lead-acid battery of claim 1, wherein an area of the plurality of the opening portion in planar view becomes smaller stepwise from a center side of the inner rib toward the first longitudinal frame rib, and becomes smaller stepwise from the center side of the inner rib toward the second longitudinal frame rib.

8. The positive electrode grid body for lead-acid battery of claim 1, wherein
among the plurality of opening portions, a plurality of opening portions adjacent to the second lateral frame rib are a first opening portion group, and
at least parts of the plurality of longitudinal crosspieces defining the first opening portion group are arranged shifted in the lateral direction from the longitudinal crosspieces defining the plurality of opening portions adjacent to the first opening portion group in the longitudinal direction.

9. The positive electrode grid body for the lead-acid battery of claim 1, wherein a cross-sectional area of the plurality of longitudinal crosspieces disposed directly under the positive electrode current collection lug becomes larger from a second lateral frame rib side toward the first lateral frame rib, and becomes the largest at a portion connected to the first lateral frame rib.

10. The positive electrode grid body for the lead-acid battery of claim 1, wherein four corners of the plurality of opening portions in planar view have rounds R.

11. The positive electrode grid body for the lead-acid battery of claim 10, wherein among the plurality of opening portions adjacent to the frame rib, at least four corners of the opening portions in planar view located at four corners of the frame rib have rounds R larger than the opening portions located at positions other than the four corners of the frame rib, and in the opening portions located at four corners of the frame rib, a size of the rounds R of the corner closest to the corner of the frame rib in the opening portion is the largest.

12. The positive electrode grid body for the lead-acid battery of claim 1, wherein a width of the positive electrode current collection lug becomes larger stepwise from an end opposite to a connection end with the first lateral frame rib toward the connection end.

13. The positive electrode grid body for the lead-acid battery of claim 1, wherein
the positive electrode grid body for lead-acid battery is formed of a lead alloy which has a composition containing 0.02 to 0.08 mass % of Ca, 0.4 to 2.5 mass % of Sn, 0.005 to 0.04 mass % of Al, 0.001 to 0.0049 mass % of Ag, a balance being Pb and unavoidable impurities.

14. A lead-acid battery comprising the positive electrode grid body of claim 1.

* * * * *